(12) United States Patent
Gettis

(10) Patent No.: US 10,119,384 B2
(45) Date of Patent: Nov. 6, 2018

(54) DEVICE FOR RECOVERY OF GAS FROM LIQUID-LOADED GAS WELLS

(71) Applicant: OPTIMUM PETROLEUM SERVICES INC., Calgary (CA)

(72) Inventor: James G. Gettis, Calgary (CA)

(73) Assignee: OPTIMUM PETROLEUM SERVICES INC. (CA)

( * ) Notice: Subject to any disclaimer, the term of this patent is extended or adjusted under 35 U.S.C. 154(b) by 183 days.

(21) Appl. No.: 15/264,790

(22) Filed: Sep. 14, 2016

(65) Prior Publication Data

US 2017/0074084 A1    Mar. 16, 2017

Related U.S. Application Data

(60) Provisional application No. 62/219,238, filed on Sep. 16, 2015.

(51) Int. Cl.
  *E21B 43/38*  (2006.01)
  *E21B 34/10*  (2006.01)
(52) U.S. Cl.
  CPC .................... *E21B 43/38* (2013.01)
(58) Field of Classification Search
  CPC ......... E21B 43/38; E21B 34/10; E21B 43/122
  See application file for complete search history.

(56) References Cited

U.S. PATENT DOCUMENTS

| 5,074,758 | A |   | 12/1991 | McIntyre |
|---|---|---|---|---|
| 5,373,897 | A |   | 12/1994 | Skarvan |
| 5,570,744 | A | * | 11/1996 | Weingarten ........ B01D 19/0057 166/357 |
| 6,027,314 | A |   | 2/2000 | Breslin |
| 2011/0004352 | A1 | * | 1/2011 | Wilde ..................... E21B 34/06 700/282 |

FOREIGN PATENT DOCUMENTS

WO    2010/009496 A1    1/2010

* cited by examiner

*Primary Examiner* — Catherine Loikith
(74) *Attorney, Agent, or Firm* — Victor A. Cardona; Heslin Rothenberg Farley & Mesiti P.C.

(57) ABSTRACT

A device for use in recovery of gas trapped by fluid and suspended solids in a gas or oil well includes a body defining a cavity with a cap at its upper end and an opening for entry of fluid at its bottom end. A lower valve controls fluid flow into, and an upper valve controls flow out of, the cavity. Pressurized gas pushes downward on fluid in the cavity in a compression stroke which closes the lower valve and opens the upper valve. Gas is exhausted from the cavity during an exhaust stroke. An effluent line allows exit of the fluid and suspended solids during the compression stroke. A probe line provides electrical power to a pair of probes for initiating and halting entry of the stream of pressurized gas into the cavity.

28 Claims, 22 Drawing Sheets

DEVICE FOR RECOVERY OF GAS FROM LIQUID-LOADED GAS WELLS

CROSS-REFERENCE TO RELATED APPLICATIONS

This application claims priority from U.S. Provisional Application Ser. No. 62/219,238, filed on Sep. 16, 2015, the entire disclosure of which is incorporated herein by reference in its entirety.

FIELD OF THE INVENTION

The invention relates to the field of hydrocarbon production and more particularly to production of gas from liquid-loaded gas wells containing suspended solids such as sand and/or silt.

BACKGROUND OF THE INVENTION

It is well known that oil and gas wells have a finite lifetime and that the production rate of an individual well will decrease gradually until resource extraction no longer becomes profitable or until regulations mandate that production from the well must be suspended.

In most cases, as oil and gas wells mature, production volumes decrease as the bottomhole pressure decreases. This results in produced fluids from the reservoir reaching a critical velocity that eventually does not permit the liquids to reach the surface without some form of artificial lift. When these liquids aren't completely removed from the well with the oil and gas production from the reservoir, they build up in the well, causing the oil and gas to flow intermittently, lowering production and eventually killing the well. This is phenomenon is known as "liquid-loading." Liquid loading is particularly problematic for conventional artificial lift equipment when the liquids contain significant volumes of particulates such as fine mud, sand and silt.

PCT Publication No. WO2010/009496 describes a gas displacement pump for use in pumping liquids for recovery of oil from stripper wells.

U.S. Pat. No. 5,074,758 describes a pump for moving liquids or slurries which is particularly adapted to move dangerous and corrosive liquids.

U.S. Pat. No. 5,373,897 describes a pneumatic underground fluid recovery device for use in a well to pump underground fluids therefrom.

U.S. Pat. No. 6,027,314 describes a pneumatically powered submersible fluids pump with a casing activator.

There remains a need for a solution to address and improve the rate of production and ultimate reserve recovery from oil and gas wells loaded with sandy, silty, muddy liquids. In most cases the particulate material in wells producing these types of liquids in conjunction with oil and gas causes conventional rotating or reciprocating artificial equipment to fail prematurely. Currently, the problems caused by sand, mud and silt are addressed using siphon string technology.

SUMMARY OF THE INVENTION

In accordance with one aspect of the invention, there is provided a device for use in recovery of gas trapped by fluid and suspended solids in a gas or oil well, the device comprising a body defining a cavity with a cap at its upper end and an opening for entry of fluid at its bottom end, the device including a lower valve for controlling flow of fluid into the cavity and an upper valve for controlling flow of the fluid and suspended solids out of the cavity, the cap having a plurality of lines passing therethrough and into the cavity, the lines comprising: a) a gas line for providing a stream of pressurized gas to push downward on fluid in the cavity in a compression stroke which closes the lower valve and opens the upper valve, the gas line further used to exhaust contained gas from the cavity during an exhaust stroke when infiltration of fluid into the cavity raises the fluid level in the cavity; b) an effluent line for allowing exit of the fluid and suspended solids during the compression stroke; and c) a probe line for providing electrical power to a pair of probes for initiating and halting entry of the stream of pressurized gas into the cavity.

In certain embodiments, the upper valve and the lower valve are both located below the pair of probes.

In certain embodiments, the probes are spaced vertically apart within the cavity in an arrangement having an upper probe for sensing an upper fluid level to trigger initiation of the compression stroke and a lower probe for sensing a lower fluid level to trigger initiation of the exhaust stroke.

In certain embodiments, the cavity further contains a plurality of baffles for halting upward movement of the suspended solids in the fluid as the fluid rises during the exhaust stroke.

In certain embodiments, each one of the plurality of baffles is supported by one or more of the plurality of lines in the cavity.

In certain embodiments, the plurality of baffles is three baffles.

In certain embodiments, the baffles are leaf-shaped and include openings for holding the one or more of the plurality of lines.

In certain embodiments, the leaf-shaped baffles are rotated with respect to each other to provide partial transverse blockage of the cavity at different cross sectional areas of the cavity.

In certain embodiments, one of the openings is configured to hold the effluent line and another one of the openings is configured to hold the probe line.

In certain embodiments, the baffles are supported by or formed integrally with the cavity's sidewall.

In certain embodiments, the effluent line terminates at the upper valve and the upper valve includes an upper ball seat and an upper check ball, wherein the upper valve is closed when the upper check ball is positioned in the upper ball seat during the exhaust stroke and wherein the upper valve is open when the upper check ball floats above the upper ball seat during the compression stroke.

In certain embodiments, the lower valve is supported by an extension of the body which extends below the upper valve and the lower valve includes a lower ball seat and a lower check ball, wherein the lower valve is closed when the lower check ball is positioned in the lower ball seat during the compression stroke and wherein the lower valve is open when the lower check valve floats above the lower ball seat during the exhaust stroke.

In certain embodiments, the extension of the body which extends below the upper valve is a tube.

Another aspect of the present invention is a device for use in recovery of gas trapped by fluid and suspended solids in a gas or oil well, the device comprising a body defining a cavity with a cap at its upper end and an opening for entry of fluid at its bottom end, the device including a lower valve for controlling the flow of fluid into the cavity and an upper valve for controlling the flow of fluid out of the cavity, the cap having a plurality of lines passing therethrough and into the cavity, the lines comprising: a) a gas line for provision of a stream of pressurized gas to push downward on fluid in the cavity in a compression stroke which closes the lower valve and open the upper valve, the gas line further used to exhaust contained gas from the cavity during an exhaust stroke when infiltration of fluid into the cavity raises the fluid level in the cavity; b) an effluent line for allowing exit of fluid suspended solids during the compression stroke; c) a probe line for provision of electrical power to a pair of probes for initiating or halting the provision of gas pressure to the cavity; and d) a bubble tube line for determining pressure in the device.

In certain embodiments, the bubble tube line is configured to be switched to a cleaning line for injection of a second stream of pressurized gas into the device.

In certain embodiments, the device further comprises an adapter attached to the bottom end of the body, the adapter configured for attachment of a pair of nested tubes including an inner tube and an outer tube, the adapter having an opening leading to a channel in the adapter's inner sidewall, wherein the bottom end of the bubble tube is placed at the opening to transmit gas from the bubble tube into a space between the outer tube's inner sidewall and the inner tube's outer sidewall.

In certain embodiments, the inner tube and the outer tube are attachable to the adapter by threading.

In certain embodiments, the upper valve and the lower valve are both located below the pair of probes.

In certain embodiments, the probes are spaced vertically apart within the cavity in an arrangement having an upper probe for sensing an upper fluid level to trigger initiation of the compression stroke and a lower probe for sensing a lower fluid level to trigger initiation of the exhaust stroke when the fluid level rises.

In certain embodiments, the cavity further contains a plurality of baffles for halting upward movement of the suspended solids in the fluid as the fluid rises during the exhaust stroke.

In certain embodiments, each one of the plurality of baffles is supported by one or more of the plurality of lines in the cavity.

In certain embodiments, the plurality of baffles is three baffles.

In certain embodiments, each of the baffles is leaf-shaped and includes one or more openings for holding the one or more of the plurality of lines.

In certain embodiments, the leaf-shaped baffles are rotated with respect to each other to provide transverse blockage of the cavity at different cross sectional areas of the cavity.

In certain embodiments, the one or more openings includes a first opening configured to hold the effluent line, a second opening configured to hold the probe line and a third opening configured to hold the bubble tube line.

In certain embodiments, the baffles are supported by or formed integrally with the cavity's sidewall.

In certain embodiments, the effluent line terminates below the adapter at the upper valve and the upper valve includes an upper ball seat and an upper check ball, wherein the upper valve is closed when the upper check ball is positioned in the upper ball seat during the exhaust stroke and wherein the upper valve is open when the upper check ball floats above the upper ball seat during the compression stroke.

In certain embodiments, the lower valve is supported by the inner tube of the body which extends below the upper valve and the lower valve includes a lower ball seat and a lower check ball, wherein the lower valve is closed when the lower check ball is positioned in the lower ball seat during the compression stroke and wherein the lower valve is open when the lower check valve floats above the lower ball seat during the exhaust stroke.

Another aspect of the present invention is a system for recovery of gas trapped by fluid and particulate matter in a gas or oil well, the system comprising: a) a device as described herein wherein the cap is attached to an upper tube for protecting the plurality of lines extending upward from the cap and the plurality of lines is covered by a single protective covering forming an umbilical cable above the cap; and b) a wellhead for sealing the well; wherein the plurality of lines extend out from the wellhead, wherein the probe line is connected to a source of electricity, the gas line is connected to a source of pressurized gas and the effluent line is connected to a fluid storage unit.

In certain embodiments, the wellhead includes a means for gripping the umbilical cable to support the device in the well.

In certain embodiments, the means for gripping the umbilical cable is a set of slips.

In certain embodiments, the wellhead is sealed from the well to prevent loss of gas or fluid as a result of potential leakage of the effluent line or the gas line.

In certain embodiments, the system further comprises a means for sealing the device from the upper tube.

In certain embodiments, the upper end of the protective tube is connected to a fishing unit for attachment of a lifter for withdrawal of the device from the well.

In certain embodiments, the fishing unit comprises a fishing neck attached to a top portion of the protective tube and an overshot tube connected to the fishing neck, the overshot tube having a restricted diameter portion for attachment of the lifter.

In certain embodiments, each one of the plurality of lines is separated from the protective covering within the wellhead and extends from the top of the wellhead as a separate line.

In certain embodiments, each of the separate lines is each sealed at its respective opening at the top of the wellhead.

In certain embodiments, the wellhead includes a production pipe connected to a gas pipeline and the gas line is connected via a three-way valve to the gas pipeline and a compressor, the three-way valve for switching between input of compressed gas into the gas line for the compression stroke and exhaust of gas back into the pipeline during the exhaust stroke.

In certain embodiments, each one of the plurality of lines is formed by an upper line and a lower line connected at connection points located above the cap of the separator, the connection points providing a means for disconnecting each of the upper lines from their corresponding lower lines and withdrawing each of the upper lines from the well while the lower lines remain associated with the separator device in the well.

In certain embodiments, at least one of the connection points represents a weak point with respect to disconnection of all of the upper lines from their corresponding lower lines.

In certain embodiments, the weak point comprises a connector with a locking spring mechanism having a variable locking set point which, when exceeded allows breakage of the weak point to allow the upper lines to be withdrawn from the well.

In certain embodiments, each of the pair of probes is supported within the cavity by a connection to the cap.

In certain embodiments, the connection to the cap is made by threaded cap attachments configured to be threaded into the body of the cap with electrically conducting connector pins extending therethrough for forming a connection of the upper probe line with the pair of probes.

Another aspect of the present invention is a method for removing fluid and suspended solids from a gas or oil well to promote production of gas from the well, the method comprising: a) installing a system as described herein in the well; b) injecting the stream of pressurized gas into the well in the compression stroke to displace liquid into the effluent line leading out of the well until the level of the fluid and suspended solids in the well reaches a lower limit indicated by the lower probe; c) halting the pumping of the gas and allowing the liquid to infiltrate into the well in an exhaust stroke until the level of the fluid and suspended solids reaches an upper limit indicated by the upper probe; and d) repeating steps b) and c) in sequence.

In certain embodiments, the method further comprises collecting data indicating bottom hole pressure, fluid production volumes and gas production volumes to assess the performance of the well.

In certain embodiments, the method further comprises conducting rate transient analysis from the data, the rate transient analysis providing a means for modelling a rate of gas production decline in the well.

In certain embodiments, step a) is performed by conveying the device into the well using a coiled tubing unit, wherein the coiled tubing unit grips and drives the umbilical cable as the umbilical cable is conveyed into the well.

Another aspect of the invention is a wellsite installation for controlling production of gas from a gas or oil well, the wellsite installation comprising: a) a system as described herein; b) a control panel for controlling and measuring: i) flow of produced gas out of the system; ii) flow of the stream of pressurized gas into the system; and iii) flow of the fluid and suspended solids out of the system; and c) a remote terminal unit for collection of data obtained at the control panel.

Another aspect of the present invention is a gas collection network comprising a plant for receiving and compressing gas produced from a plurality of wellsite installations as described herein, the plant including a compressor for compressing the produced gas transferred from the wellsite installations and a water tank for storing the fluid and suspended solids transferred from the wellsite installations.

In certain embodiments, the plant further comprises a master terminal unit for analysis of the data collected at the control panel.

In certain embodiments, the gas collection network further comprises a dehydrator located at the plant to remove water vapor from the produced gas.

In certain embodiments, the gas collection network further comprises a master terminal unit in data and control communication with the remote terminal unit, the master terminal unit having a user interface displaying data from the control panel including downhole pressure, casing pressure and flow rate.

In certain embodiments, the gas collection network further comprises a fluid line to transmit the fluid and suspended solids to the plant for storage.

In certain embodiments, the gas collection network further comprises a gas recycling line to transmit gas from the dehydrator at the plant to the wellsite installation as the source of the stream of pressurized gas for generating the compression stroke.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale. Emphasis is instead placed upon illustrating the principles of various embodiments of the invention. Wherever possible, similar reference numerals indicate similar components.

FIG. 11D is a magnified view of the circle 12D in FIG. 12C showing detail of the locking spring 224 and o-rings 227a and 227b.

DETAILED DESCRIPTION OF THE INVENTION

Rationale

Figure 1:
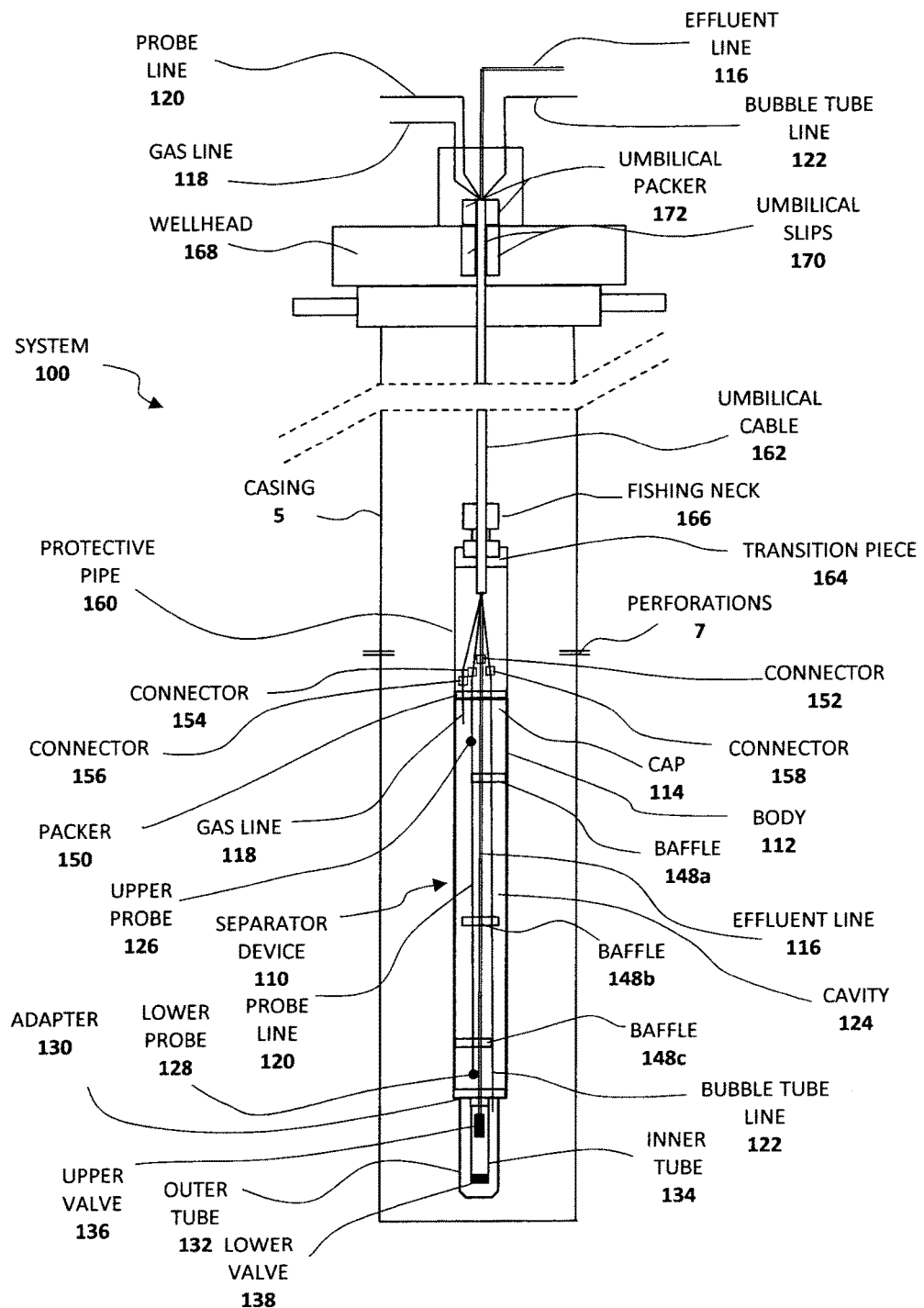
FIG. 1 is a schematic cross-sectional view of a system 100 according to one embodiment of the invention.

Reservoir pressure depletion resulting from hydrocarbon production eventually leads to insufficient velocity in the well to allow a gas well to unload produced fluids. As the fluid level in the vertical wellbore rises, the hydrostatic pressure of the fluid restricts the flow of gas to surface, and production diminishes. Attempts to address this problem have typically been prone to early failure or prohibitively expensive, or both. Consequently, liquid-loaded wells are often abandoned before all recoverable reserves have been produced.

An additional problem encountered by gas producers in Canada is that when production at a gas well drops below 2 barrels of oil equivalent per day (BOEPD) the operator must post a performance bond with the Energy Regulator of the particular provincial jurisdiction in accordance with a regulatory framework known as Licensee Liability Rating Legislature. If gas production falls to zero in a given well, the bond can be as high as $60,000 per well. If the operator does not post the bond, the Energy Regulator is authorized to shut in the well. The operator must then provide $60,000 to abandon the wellbore and the facilities. With the later issuance of a reclamation certificate, the operator, upon presentation of the reclamation certificate will be released from the bond. This process can take longer than five years in some cases. Including the shut-down costs, a Licensee Management Rating equal to one can require as much as $120,000 in capital per well with $60,000 required for payment of the bond and $60,000 to actually abandon the well and reclaim the wellsite and access road.

It would be advantageous for gas production companies to increase gas production and recover more reserves before ultimately being faced with a Limited Liability Rating situation.

About 85 million years ago, a huge inland sea covered the middle of North America. For example, the location of Writing-On-Stone Provincial Park on the Milk River in southern Alberta, would have been located on this very large and stormy sea. Sand was deposited on the shore which, over millions and millions of years, slowly compacted to become sandstone rock. This became part of the Milk River Formation. There are a number of regions in this area with high numbers of low-producing gas wells and most of these wells are liquid-loaded.

A well becomes liquid loaded when the fluid velocity in the well falls below 10 feet per second. Dewatering these wells with conventional tools is problematic due to the nature of the silt and mud in the fluid produced with the natural gas. A siphon string provides a near-term solution to this problem because it is constructed of plastic with a smaller inside diameter than most of the shelf steel tubing strings. These plastic strings have a lower coefficient of friction and are less expensive when compared to steel strings. However, a more robust and effective system for recovering gas from liquid-loaded gas and oil wells is desirable.

Overview and Advantages of the System and Method

The system and method described herein separates gas from liquids in liquid-loaded wells using a separator device provided with downhole probes to determine when the device is filled with fluid and when it is empty. When the inner cavity of the separator device is full of fluid produced from the reservoir, an upper probe recognizes the liquid level at or near the top of the device and triggers the injection of external pressurized gas in a compression stroke to displace the fluid into an effluent line where it is pushed out of the well by positive gas displacement. The fluid is moved using the pressure of the injected gas and as such does not rely upon reservoir pressure. This fluid in the effluent line moves directly to a water tank. The silt or other suspended solids in the fluid may be separated from the fluid and sold as a value-added fertilizer or fill product. The lower level of fluid in the casing will allow greater volumes of gas to infiltrate into the casing annulus from the perforations and diffuse upward to the wellhead where it is conveyed out of the well and into a pipeline according to conventional processes.

The amount of pressure required to move the fluid into the effluent line depends on the specific gravity of the fluid and the depth of the separator device. The fluid produced in the wellbore is moved to the surface without the benefit of reservoir pressure and minimum velocity restrictions that cause liquid loading. This fluid is subsequently produced directly to the water disposal tank. Sending fluids directly to the production tank at a central plant instead of the gas gathering system connected to the plant reduces the pipeline pigging frequency by about 5-fold and frees up operating personnel to allow them to conduct predictive maintenance at the wells and the plant equipment.

When the fluid is moved out of the separator device via the effluent line, the fluid level drops until a lower threshold is recognized by a lower probe. At this threshold, the injection of pressurized gas is stopped and the infiltration of fluid from the well into the separator device is allowed to proceed in an exhaust stroke until the fluid level rises once again (pushing gas out of the cavity of the device via the gas line) to the top probe which once again triggers the injection of pressurized gas to initiate another compression stroke. The gas exhausted is delivered back to its original source, which, in certain embodiments, is a gas pipeline leading to a processing plant. A relatively small volume of gas is recycled back to the well to repeat the cycle. The frequency of cycle depends on the productive capability of the reservoir.

One advantage provided by the system and method is that it reduces the frequency of pigging required to keep the gas-gathering lines fluid free.

Another advantage is that inflow performance and productivity of a wellsite installation with the separator device and system becomes stable and depletion is more predictable extending the recoverable reserve life of a well when the fluid level is constantly below the perforations connecting the reservoir to the wellbore.

Another advantage is that the system is amenable to operation in an information network of data analytics, such that a single field operator can monitor hundreds of wells online. The operator then only deals with wells that do not meet production expectations. Trouble shooting and repairs can be done from the computer terminal in most cases. This reduces labor costs and time required for maintenance.

Another advantage is that geothermal energy transferred by the fluids from the reservoir to the surface by the system is used to heat the inside of the wellhead shelter. This reduces the need to use methanol to avoid freezing of liquid lines and obviates the need for service companies to thaw frozen lines.

Another advantage is that with operation of the system, the majority of fluid and gas separation occurs downhole at the perforations of the well and this minimizes a need for surface separators. This reduces the surface footprint and reduces the chances of spills which would impact the environment. Eliminating surface separators reduces property taxes.

Another advantage is that the separator device is deployed in a well by using a conventional coiled tubing rig with conventional chains and an injector to grip and lower the umbilical cable containing the lines required for operation of the separator device. Furthermore, conventional coiled tubing injection rigs are lighter and are not subject to seasonal restrictions as are other types of service rigs and drilling rigs.

Another advantage is that the system containing the bubble tube provides a means for conducting rate transient analysis and as a result, remaining recoverable reserves currently calculated by production decline analysis can be verified and calculated using modern rate transient methods. The optional bubble tube feature of the system which is described herein below provides a means for continuous measurement of bottomhole pressures, and continuous producing fluid levels. The data from the continuous bottomhole pressure measurement is used to determine the best drilling spacing to recover unswept reserves in the reservoir. In addition, the bubble tube feature provides a conduit for cleaning of the device and the annulus of the well with high pressure gas to break up larger solid masses that can accumulate in the wellbore when producing into the downhole separator.

Another advantage relating to the capability of conducting rate transient analysis is that new drill spacing units can be determined based on pressure draw down analysis to drain unswept reserves. Surface drilling footprints based on having fewer wells present helps the environment and the economics of developing gas reserves.

Definitions

As used herein, the term "wellhead" refers to the combined components at the surface of a well that provide the structural and pressure-containing interface for the production equipment. The functions served by the wellhead include, but are not limited to: providing a means for pressure sealing and isolation of the casing at the surface, providing a means for attachment of equipment such as a blowout preventer, a Christmas tree, a well pump and/or a separator device according to the invention, and providing a means for accessing the well itself, during workover operations for example. A wellhead is also used to connect the wellhead blowout preventer during workover operations using a coiled tubing rig or conventional service rig.

As used herein, the term "umbilical cable" refers to a cable holding the lines which are used to support and operate the separator device of the invention in a gas well.

As used herein, the term "casing" refers to a pipe inserted into a drilled hole and cemented in place. Casing is installed to protect fresh water formations, isolate a zone of lost returns or isolate formations with significantly different pressure gradients. Casing is usually manufactured from plain carbon steel. After it is installed and cemented in place, it is perforated with holes at various intervals to permit fluids and hydrocarbons under static pressure in the reservoir to be produced into the wellbore and eventually to the surface.

As used herein, the term "packer" refers to a device for sealing a wellbore or a section thereof. A packer will have an initial smaller diameter which is expandable to seal the wellbore or section thereof. Packers employ flexible, elastomeric elements that expand. The two most common forms are the production or test packer and the inflatable packer. The expansion of the former may be accomplished by squeezing the elastomeric elements (somewhat doughnut shaped) between two plates, forcing the sides to bulge outward. The expansion of the latter is accomplished by pumping a fluid into a bladder, in much the same fashion as a balloon, but having more robust construction.

As used herein, the term "weak point" refers to a position along a length of a cable or pipe which is expressly provided as a break point of the cable or pipe when a pre-determined pulling force is exerted upon that cable or pipe. A weak point may be provided by alteration of the materials forming the cable or pipe at the desired position, or may be provided by an expressly designed mechanical connection structure designed to disengage when the pre-determined pulling force is met and exceeded.

As used herein, the term "perforation" refers to a tunnel created in the casing to the reservoir formation, through which oil or gas enters for production.

As used herein, the term "line" refers to any conveyance structure or combination of connected conveyance structures providing a basic conveyance function over a distance. Accordingly, the related term "gas line" refers to a conduit providing conveyance of gas into and out of the separator device of the invention, the related term "effluent line" refers to a conduit for conveying effluent in the form of fluid away from the separator device of the invention, the related term "probe line" refers to an electrical conduit for providing electricity to each member of a pair of probes which detect the presence of fluid for the purpose of controlling compression and exhaust strokes of the separator device, and the related term "bubble tube line" refers to a conduit for providing gas into the separator device for the purpose of pressure measurements and for the purpose of cleaning the separator device and the annulus of the well.

As used herein, the term "compression stroke" refers to the half cycle of the separator device wherein gas is injected into the device to force liquid and silt out of the cavity of the device via an effluent line.

As used herein, the term "effluent" refers to fluid and suspended solids discharged from the separator device according to certain embodiments of the invention.

As used herein, the term "exhaust stroke" refers to the half cycle of the separator device wherein gas injection is halted and liquids enter the cavity of the device.

As used herein, the terms "water" and "fluid" are used interchangeably and refer to water in any mixture state that may be encountered in a liquid-loaded gas well as a result of infiltration from the formation into the well. The mixture may include oil, dissolved gases, dissolved mineral salts and suspended solids, including, but not limited to, mud, sand, and silt and precipitated mineral salts.

As used herein, the term "baffle" refers to any structure provided in a cavity or channel to block and/or impede the flow of fluids and/or particulates contained therein.

As used herein, the term "rate transient analysis" refers to analysis of continuous production and flowing pressure data to characterize a reservoir for the purposes of determining remaining reserves and developing resource extraction strategy which may be done through infill drilling or enhanced recovery techniques.

As used herein, the term "fishing" refers to the application of tools for removal of objects stuck in a wellbore, which require retrieval using "fishing tools."

As used herein, the term "pigging" refers to the act of forcing a device through a pipeline for the purpose of displacing or separating fluids and for cleaning or inspecting the pipeline. Pigging will reduce back pressure at each wellhead and this will optimize production volumes.

As used herein, the term "bubble tube" refers to a conduit used for injection of a gas into a well or into equipment installed in a well at a controlled rate for the purpose of continuous measurement of downhole pressure. A bubble tube system provides the ability to measure downhole pressure while having complete isolation from the well fluid media by measuring the flowing pressure on surface of a gas bubbling at the bottom of a capillary tube in a well. The measurement instrument can be located potentially thousands of feet from the bottom of a well. This isolation makes the bubble tube system suitable for use in wells with corrosive, acidic, hazardous, liquids at very hot temperatures. It is intrinsically immune to surface foam, pH, conductivity, temperature, turbulence, viscosity, and solids content.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Overview of the Separator System

One aspect of the present invention is a separator device constructed for use in a system for separation and recovery of gas trapped in a gas well by fluid and particulate matter such as fine mud and/or silt. To facilitate a discussion of the separator device, the separator system will first be discussed in general terms, followed by a more detailed description of the features of the device itself.

Turning now to FIG. 1, there is shown a cross-sectional illustration of one embodiment of a system 100 for recovery of oil and gas trapped in a gas well by fluid and particulate matter in accordance with the present invention. The system 100 is deployed in the casing 5 of an oil or gas well and includes a separator device 110 which is deployed below the perforations 7 in the casing 5. The device 110 is formed by a hollow cylindrical body 112 with a cap 114 attached to the open top of the body 112. The cap 114 has openings to allow passage of a plurality of lines that provide specific functions for the separator device 110 as described hereinbelow. The central line in this embodiment of the separator device 110 is the effluent line 116. On the far left of the effluent line 116 is the gas line 118 which acts as a dual purpose gas compression and exhaust line. The gas line 118 terminates immediately beneath the cap 114. Between the gas line 118 and the effluent line 116 is the probe line 120. To the right of the effluent line 116 is the bubble tube line 122.

The features and functions of the four lines 116, 118, 120 and 122 will now be briefly described. The effluent line 116 carries fluid and suspended solids out of the well on the compression stroke when the separator device 110 is operating. The gas line 118 provides pressurized gas into the separator device 110 during the compression stroke and exhausts gas out of the device 110 during the exhaust stroke. The probe line 120 is an insulated electrical line to provide power to the probes 126 and 128 which sense fluid levels in the separator cavity 124 as described in more detail below. The bubble tube line 122 provides a means for continuously measuring downhole pressure and for cleaning the bottom of the device 110 and the annulus of the well as described in more detail below.

It is advantageous to make the lines 116, 118, 120 and 122 rigid to avoid kinking and the various problems associated therewith. Therefore, pipes formed of steel or other similarly rigid material or metal alloy are used as the effluent line 116, the gas line 118 and the bubble tube line 122. In most embodiments, the probe line 120 is a combination of wires protected by insulation. In one example embodiment, the diameter of the effluent line 116 is about 0.75 inches, the diameter of the gas line 118 is about 0.5 inches and the bubble tube line 122 is about 0.375 inches. These dimensions have been found to be appropriate for one embodiment of a cylindrical separator device with a body 112 having an inner diameter of about 3.188 inches. The skilled person will recognize that these dimensions are indicative of one embodiment and may be altered if desired for any reason pertaining to improvement of any aspect of operation of the separator device 110. Such alternative embodiments with alternative dimensions are within the scope of the present invention.

Figure 3A:
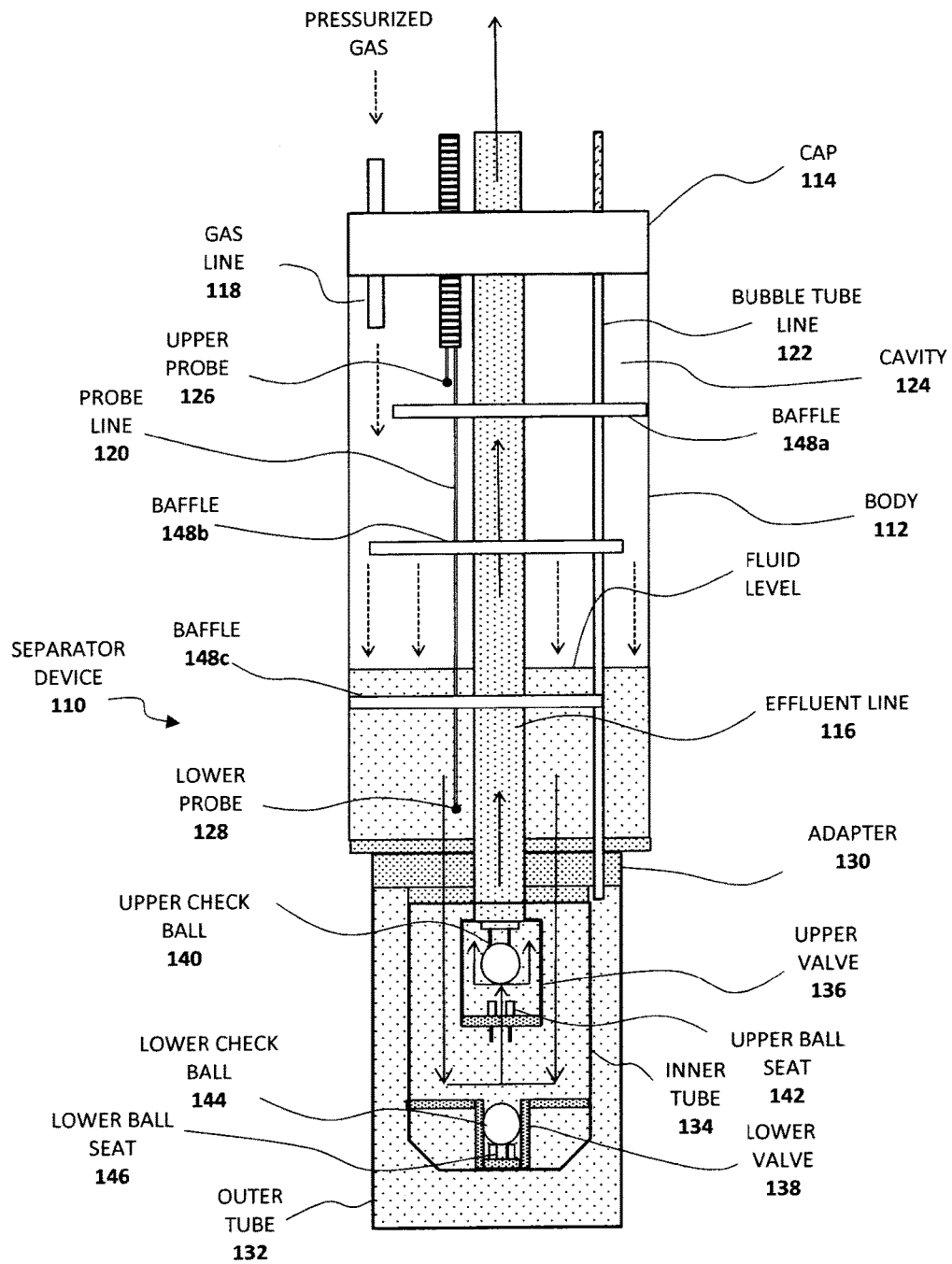
FIG. 3A is a schematic cross sectional view of the separator device 110 of the system 100 indicating the flow of gas and fluid during the compression stroke of the separator device 110 when pressurized gas is injected into the separator device 110 via the gas line 118.
Figure 3B:
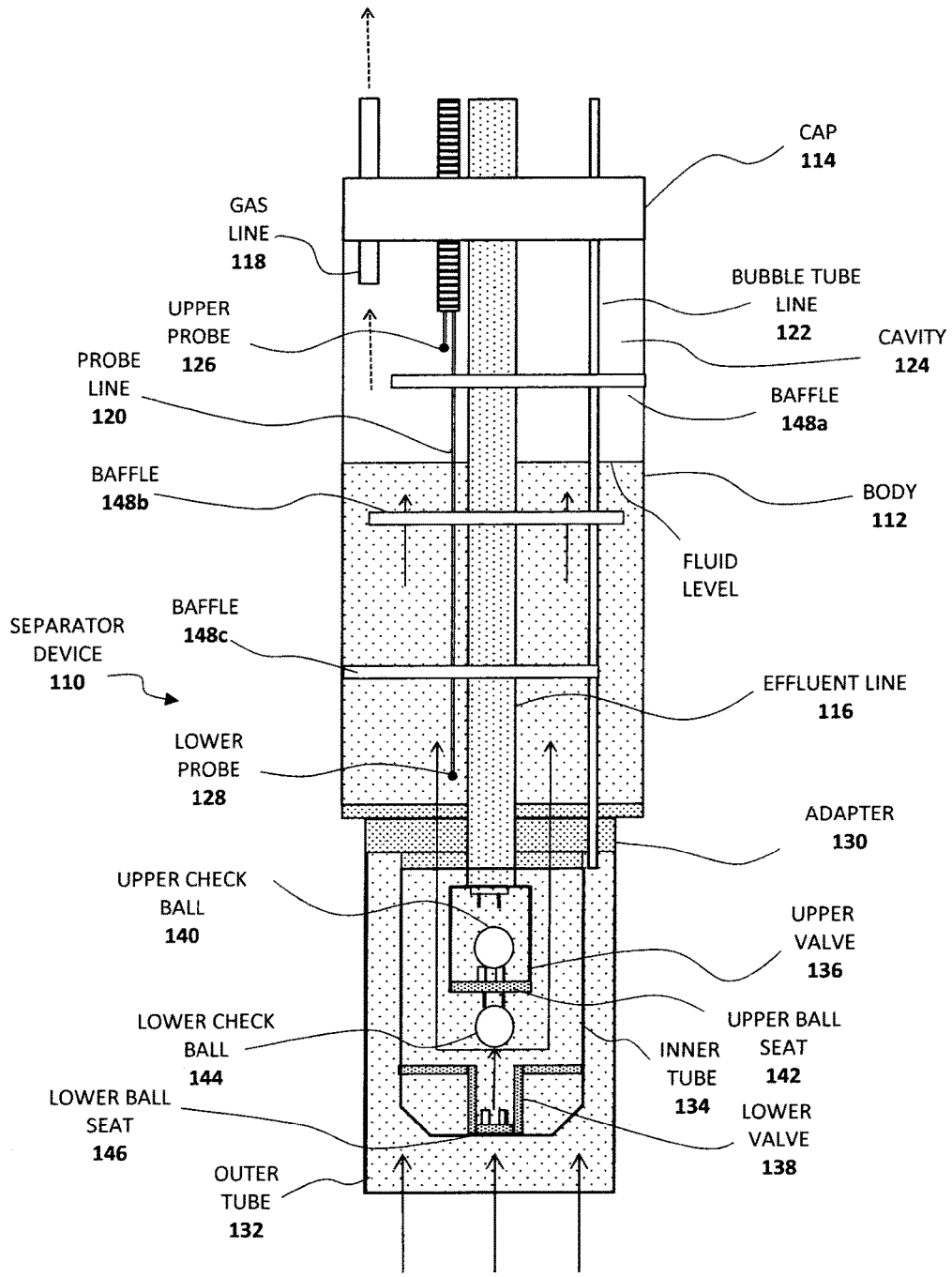
FIG. 3B is a is a schematic cross sectional view of the device 110 of the system 100 indicating the flow of gas and fluid during the exhaust stroke of the separator device 110 when pressurized gas is no longer injected into the separator device 110 and fluid infiltrates from the reservoir into the bottom of the separator device 110.

To retain clarity in FIG. 1, the probe line 120 is shown as being attached to an upper probe 126 and a lower probe 128 (both shown with black circles in FIG. 1). Alternative embodiments have a probe line 120 which is booted and connected by a tight fitting to the upper and lower probes 126 and 128, each mounted separately in the top end of the pump body. This arrangement is shown in FIGS. 3A and 3B. Still other embodiments have probes each supported by two distinct probe lines. All of these alternative embodiments are within the scope of the invention. The upper and lower probes 126 and 128 are provided to identify two different levels of fluid in the cavity 124 which are reached during regular cycling of the separator device 110 as described in more detail herein below. Examples of such sensors include but are not limited to, conductivity sensors, tuning fork sensors, optical sensors and dielectric sensors. Any sensor capable of sensing the presence of a liquid may be adapted for use as a probe for use with the present invention and such alternatives can be constructed by the skilled person routinely, without undue experimentation.

In certain embodiments, the probe line 120 is insulated with an abrasive resistant coating such as polyethylene to prevent electrical shorting. Such coatings are known to the skilled person and can be applied appropriately without undue experimentation.

In FIG. 1, it is seen that the bubble tube line 122 extends out of the bottom of the separator body 112. The bubble tube line 122 is included in this embodiment of the system in order to provide a means for measurement of the reservoir pressure for the purpose of performing rate transient analysis in accordance with known bubble tube pressure measurement methods and also to provide a means for cleaning the separator device 110 and the annulus of the well by sweeping the bottom of the separator device 110 with high pressure gas. To provide this dual function, a bubble tube line valve is provided (as described herein below with reference to FIG. 2) with appropriate connections in accordance with known methods. Alternative embodiments do not include a bubble tube line. In the embodiments that do not include a bubble tube line, the separator device 110 may be provided with a different means for monitoring pressure in the separator device, if desired.

The bottom of the body 112 of the separator device 110 is attached to an adapter 130. The function of the adapter 130 is to provide a means for attachment (for example, by threading) to two nested tubes, an outer tube 132 and an inner tube 134 which is nested within the cavity of the outer tube 132. The bubble tube line 122 may extend through the adapter 130 and into the space between the nested tubes 132 and 134, or it may be simply placed adjacent to an opening in the sidewall of the adapter 130, which extends via a channel into the space between the inner sidewall of the outer tube 132 and the outer sidewall of the inner tube 134. This arrangement will be described in more detail hereinbelow with reference to FIG. 7.

Returning now to FIG. 1, it is seen that residing within the cavity of the inner tube 134 are an upper valve 136 and a lower valve 138. The specific structure and operation of particular embodiments of these valves will be discussed in more detail hereinbelow with reference to FIGS. 3A and 3B. For the purposes of this general discussion, it is to be understood that during the compression stroke of the separator device 110 which is initiated when the upper probe 126 senses the fluid level at its position, pressurized gas enters the cavity 124 via the gas line 118. The fluid level in the cavity 124 is forced downward under this gas pressure. This causes the lower valve 138 to close and also causes the upper valve 136 to open, thereby allowing entry and flow of fluid into the effluent line 116 which is connected to the upper valve 136. On the exhaust stroke, which is initiated by the lower probe 128 sensing that the fluid level has dropped to its position, the entry of pressurized gas into the cavity 124 via the gas line 118 is halted. This allows the fluid level in the cavity 124 to rise again as a result of fluid infiltration from the reservoir as a result of the removal of fluid from the well. Gas remaining in the gas line 118 is vented to the gas-gathering pipeline and reaches pressure equilibrium with the gas-gathering pipeline. With the reduced pressure, valve 136 closes and valve 138 opens. Fluid enters the bottom of the inner tube 132 and opens the lower valve 138 to enter the inner tube 134. The hydrostatic pressure of the fluid in the effluent line 116 keeps valve 136 closed and the fluid level gradually increases in the cavity 124 until it reaches the upper probe 126 thereby triggering the next compression stroke. The separator device 110 will continue to cycle in this manner as long as fluid enters the cavity 124 from the reservoir. The rate of filling of the cavity 124 of the separator device 110 is variable and depends upon the unique deliverability characteristics of each wellbore in a particular reservoir.

The skilled person will recognize from this description that the separator device 110 operates at a rate which matches the rate of infiltration of fluid into the reservoir and thus, the volumes of gas injected to drive the operation of the separator device 110 are matched to the requirements of the reservoir.

It is to be understood that the fluid level in the separator device 110 and the well will be at its lowest level when the separator device cycle is at the bottom of the compression stroke. Because the fluid level is low at this point, the hydrostatic head pressure of the column of fluid is low and more gas is able to escape from the reservoir via the perforations 7 in the casing 5 of the well. In certain situations, the fluid level will be below the perforations of the well and the reservoir pressure at the perforations will now be at the same pressure as the pressure of the gas gathering line. Therefore, in this situation, gas is produced uninhibited by a hydrostatic head of fluid and it moves to the surface gas gathering line via the wellhead 168.

One of the problems addressed by certain aspects of the present invention is the removal of fluid containing suspended solids such as fine mud and silt. Such suspended solids will quickly clog the effluent lines of conventional reciprocating or rotating artificial lift equipment. While the separator device of the present invention operates on the general principle of positive gas displacement of fluids, there is still significant potential for particulate matter such as silt or fine silicate mud particles to enter the gas line 118 on the exhaust stroke. Therefore, in certain embodiments, the cavity 124 of the separator device 110 is provided with a plurality of baffles to interrupt the upward movement of fluid and particulates in the cavity 124 during the exhaust stroke. This interruption of flow causes the particulates to drop downward and thus, fouling of the gas line 118 is prevented.

The skilled person will recognize that baffles may be attached to or otherwise integrally formed in the inner sidewall of the cavity 124. A more effective solution is provided as shown in FIG. 1 by constructing a set of baffles 148a, 148b and 148c each having a means for attachment to one or more of the lines in the cavity 124. This simplifies the construction of the body 112. In addition, if the baffles 148a, 148b and 148c are substantially equally spaced and supported by each one of the three lines that extend down the majority of the length of the cavity 124, the structure of each baffle acts as a centralizer, keeping the three lines 116, 118 and 120 parallel and generally straight. The specific structure of a specific embodiment of set of baffles 248a, 248b and 248c is described herein below with reference to FIGS. 4A, 4B and 5. The skilled person will recognize that alternative arrangements are possible wherein the baffles are supported by only one of the three lines which extend down the majority of the length of the cavity 124. Such alternative embodiments are within the scope of the invention.

Returning now to FIG. 1, the features of the system 100 external to the separator device 110 which are located above the cap 114 will now be described. As noted above, four lines including the effluent line 116, the gas line 118, the probe line 120 and the bubble tube line 122 extend upward through openings in the cap 114. The connectors 152, 154, 156 and 158 are located above the cap 114. In certain embodiments, the effluent line 116, the gas line 118, and the bubble tube line 122 are continuous lines extending through the cap 114 to the surface via the wellhead 168 and the only line with a connector is the probe line 120.

The area above the cap 114 is provided with a protective pipe 160 which is connected to the cap 114 by a threading mechanism, for example. A sealing means designated herein as umbilical isolation packer 150 is placed in the protective pipe 160 above the cap 114 to isolate the upper part of the system 100 from the separator device 110 because it is advantageous to restrict fluid from entering this upper part of the system 100.

To facilitate assembly of the system 100 in stages, it is advantageous to terminate each of the four lines 116, 118, 120 and 122 extending above the cap 114 and to connect each of these lines to upper lines (having the same reference numerals) via connectors 152, 154, 156 and 158. The upper lines are then collected and encased in a sheath of protective elastomeric material to provide a single umbilical cable 162 which extends upwards in the cavity of the protective pipe 160.

It is advantageous to provide the umbilical cable 162 with as much strength as possible because it is subjected to significant force of gravity on its cumulative weight when being deployed into a well by a conventional coiled tubing unit which grips and injects the umbilical cable into the casing. It has been determined that the structural strength of the umbilical cable 162 is improved significantly if the four lines 116, 118, 120 and 122 contained therein are twisted into a repeating helical pattern prior to covering with the protective material. In one embodiment, the helical pattern for the four lines 116, 118, 120 and 122 repeats at intervals ranging between about 8 to about 14 inches.

In the embodiment of FIG. 1, the system is provided with a means for withdrawal of the separator device 110 from the well. The skilled person will recognize that this means for withdrawal is not required for operation of the separator device and therefore should be considered an optional feature. To provide the withdrawal mechanism of this embodiment, the upper end of the protective pipe 160 is provided with a means for connection (for example, by threading) to a fishing neck 166 which itself is provided with a means for connection to an overshot for connection to a lifter (not shown). The fishing neck 166 includes a set of slips and packers (not shown) for securely grasping the umbilical cable 162. This provides a convenient integral mechanism for retrieval of the separator device 110 when it requires maintenance or when gas recovery operations are complete.

The system 100 also includes a wellhead 168 which allows passage of the umbilical cable 162 while sealing the well. An intermediate section of the wellhead 168 is provided with a set of umbilical slips 170 to grip and support the umbilical cable 162 and an umbilical packer 172 above the slips to provide further sealing of the well at the wellhead 168. An advantageous feature of this particular embodiment is that the four lines (effluent line 116, gas line 118, probe line 120 and bubble tube line 122) are separated from the umbilical cable 162 within the body of the wellhead 168 and emerge from the wellhead as separately sealed distinct lines 116, 118, 120 and 122. This feature enhances the security of the wellhead 168. Detailed views of a specific wellhead embodiment 268 are described herein below with reference to FIGS. 9A to 9E.

Returning now to FIG. 1, it is seen that above the wellhead 168, the effluent line 116 removes fluid from the system 100. The fluid is sent to a tank (not shown in FIG. 1) and the suspended solids are allowed to settle and then can be separated. In some cases, the suspended solids are silt or other organic matter which can be used as an agricultural product or fill, for added value. Generally the recovered solid will require chemical treatment to be used for agricultural applications.

Figure 2:
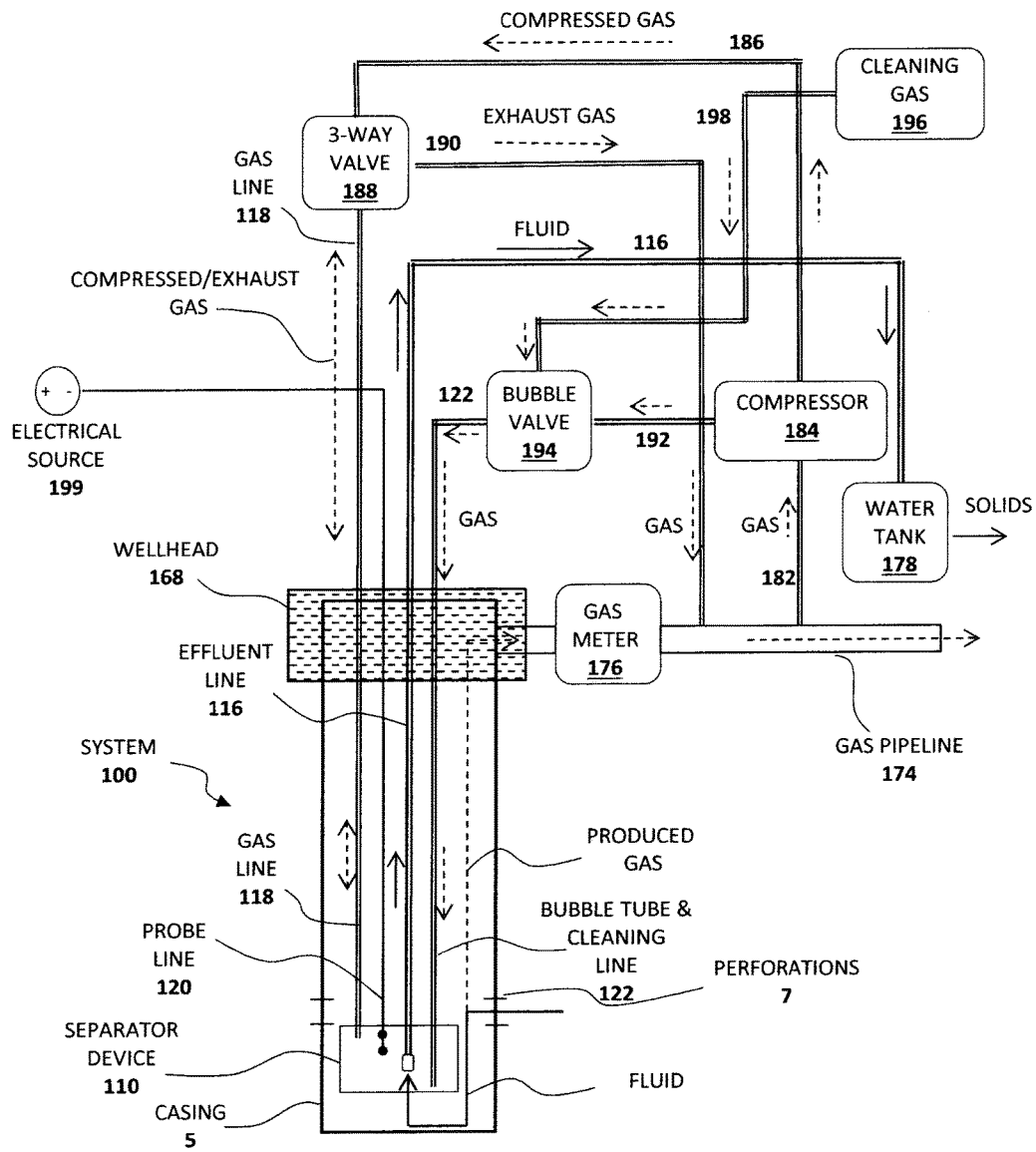
FIG. 2 is a schematic process diagram indicating how a reservoir comprising oil, water, suspended solids and gas are produced into the well and moved to a surface pipeline for further processing.

Referring now to FIG. 2, where the same reference numerals are used to indicate the same features, there is shown a schematic flow diagram indicating how fluid and gas flows through and out of the system 100. The flow of fluids is shown with solid arrows and the flow of gas is shown with dashed line arrows. In this simplified schematic view of the system 100, the view of the separator device 110 is simplified relative to the view of FIG. 1. The effluent line 116, the gas line 118, the probe line 120, the bubble tube line 122, and the wellhead 168 are shown.

Gas and fluid enters the casing 5 of the well from the perforations 7. The fluid moves downward and enters the separator device 110. The gas moves upward within the casing annulus and exits the well via a conventional port on the right side of the wellhead 168. This produced gas enters a gas meter 176 and is then directed into the gas gathering pipeline 174 the gas meter sends a signal to the remote terminal unit (not shown) which determines volumes of gas produced.

The fluid entering the separator device 110 is conveyed out of the well via the effluent line 116 during the compression stroke of the separator device 110. During proper functioning of the separator device 110 the effluent line 116 is always filled with fluid and the direction of flow is out of the separator device 110 on the compression stroke with no flow on the exhaust stroke. The effluent line 116 emerges from the well and, in this particular embodiment, is sent to a water tank 178 either on site or conveyed to a tank at a remote location.

Gas is removed from the pipeline via a branch conduit 182 and sent to a compressor 184 to pressurize the gas for the compression stroke of the separator device 110. For efficient functioning of at least some of the embodiments of the system 100 described herein, a pressure range between about 800 to about 1200 psi is used. The pressurized gas follows conduit 186 to a 3-way valve 188. On a compression stroke of the separator device 110, the 3-way valve 188 will be open between conduit 186 and the gas line 118 and thus the pressurized gas moves down via the gas line into the separator device 110 where it pushes fluid into the effluent line 116.

On the exhaust stroke, the flow of pressurized gas into the gas line 118 is shut off by the 3-way valve 188 which switches to an exhaust conduit 190. This exhaust gas conduit 190 is joined to the gas pipeline 174. The exhaust stroke is at the same pressure as the gas pipeline 174 and the length of time for the exhaust cycle depends on the rate of reservoir fluid production into the separator device 110.

The skilled person will recognize that in certain embodiments, the 3-way valve 188 may be electrically linked to the probe line 120 so that the probes which control the timing of the compression and exhaust strokes of the separator device 110 also control the 3-way valve 188. Such an arrangement can be constructed by the skilled person without undue experimentation. The probe line 120 is connected to an electrical source 199 to provide power to the probes which are responsible for switching between the compression and exhaust strokes of the separator device 110.

In addition to providing the source of pressurized gas for driving the compression stroke of the separator device 110, the compressor 184 provides compressed gas to the bubble tube line 122 via conduit 192 when the bubble valve 194 is open between conduits 192 and the bubble tube line 122. The bubble valve 194 is also connected to a source of high pressure cleaning gas 196 via conduit 198. When the bubble tube line 122 is connected to conduit 198, high pressure gas is pumped into the bubble tube line 122 and streams outward at the bottom of the separator device 110 between the nested tubes formed by the outer tube 132 and the inner tube 134 (see FIG. 1) the constriction of flow caused by this arrangement causes the injected gas to uniformly sweep the bottom of the separator device 110 to obtain effective cleaning of the annulus defined by the inner sidewall of the casing 5 as well as the bottom valve 138 of the separator device 110. A more detailed embodiment incorporating this feature is described in more detail herein below with reference to FIG. 7.

Operation of the Separator Device

A more detailed description of the operation of the separator device 110 will now be described with reference to FIGS. 3A and 3B, where the same reference numerals used in FIGS. 1 and 2 are retained.

Continuing with the same arrow flow scheme of FIG. 2, the flow of gas is shown with dashed arrows and the flow of fluid is shown with solid arrows.

FIG. 3A schematically illustrates the flow of fluid and gas through the separator device 110 during the compression stroke of the separator device 110. Pressurized gas flows into the separator device 110 via the gas line 118 and pushes down on the fluid level in the cavity 124 of the separator device 110, as indicated by the dashed arrows. The fluid flows downward under this pressure. This particular embodiment of the separator device 110 is provided with two ball valves 136 and 138. Alternative embodiments employ other types of valves. In certain embodiments, the ball valves 136 and 138 include balls 140 and 144 formed of plastic such as polyurethane and ball valve seats 142 and 146 formed of hard materials such as ceramics.

The fluid flowing downward under pressure during the compression stroke of the separator device 110 causes the lower check ball 144 to drop into the lower ball seat 146 to close the lower valve 138. The upward flow of fluid from the reservoir is thus blocked. The fluid is then forced upward into the upper valve 136 and the downward motion of the fluid unseats the upper check ball 140 from the upper ball seat 142 to open the upper valve 136. This allows the fluid to enter the effluent line 116. As long as pressurized gas is injected into the gas line 118, fluid will be forced upward through the effluent line 116 and will exit the top of the separator device 110. The compression stroke illustrated in FIG. 3A continues until the fluid level reaches the lower probe 128. When the lower probe 128 senses that the fluid level has dropped to or below its location, the compression stroke is halted and the exhaust stroke begins as illustrated in FIG. 3B.

FIG. 3B schematically illustrates the flow of fluid and gas through the separator device 110 during the exhaust stroke of the separator device 110. The flow of pressurized gas that flows into the separator device 110 via the gas line 118 during the compression stroke is now stopped. As a result, the fluid level in the cavity 124 gradually rises (as shown by the solid arrows) in the cavity 124 of the separator device 110 as fluid gradually infiltrates the well from the formation. The fluid enters the cavity 124 via the bottom of the outer tube 132 and then enters the inner tube 134 where it unseats the lower check ball 144 from the lower ball seat 146 in the lower valve 138. This action allows the fluid level to move up into the cavity 124. This upward movement of fluid does not have sufficient pressure to unseat the upper check ball 140 from the upper ball seat 142 of the upper valve 136. As a result, the bottom entrance to the effluent line 116 remains closed and fluid does not move upward in the effluent line 116 during the exhaust stroke.

As noted above, when the fluid level in the well is low, greater volumes of gas can escape from the formation into the well and be captured as production gas at the wellhead. The rate of infiltration of fluid will be dependent upon the characteristics of the formation, and several hours may pass before the fluid level reaches the upper probe 126 to halt the exhaust stroke and initiate the compression stroke.

It is to be understood that as the fluid level rises in the cavity 124 the baffles 148a, 148b and 148c interrupt this upward flow and the particulate matter (mud, silt and the like) present in the fluid will tend to drop downward, thereby preventing fouling of the gas line 118. This also enhances the removal of the particulates from the cavity 124 via the effluent line 116.

The effect of the fluid level increasing in the cavity 124 is that the pressurized gas remaining in the cavity 124 at the end of the compression stroke is now displaced out into the lower opening of the gas line. This exhaust gas is sent back to the pipeline as indicated by line 190 via the 3-way valve 188 in FIG. 2.

As described above, one of the functions of the bubble tube line 122 is to perform cleaning operations. Accordingly, in a first mode of operation, the bubble tube line 122 is configured to clean the lower valve 138 of the separator and in a second mode of operation, the bubble tube is configured to clean the area between the casing 5 and the separator device 110. In the first mode, for cleaning the lower valve 138, the cleaning operation is initiated during the exhaust stroke. In the second, mode, cleaning of the area between the casing annulus 5 and the separator device 110 is initiated during the compression stroke. This prevents gas from flowing into the effluent line 116.

Features of Example Embodiments

A number of features of example embodiments of various features of the separator device and system will now be described. These features may be provided in various combinations in construction of various alternative embodiments of the present invention. While the components of the system and method described using reference numerals in the 100 series in FIGS. 1 to 3, more detailed features of the components are described in FIGS. 4 to 12 using reference numerals in the 200 series and the 300 series (probes only) while the general features retain their original reference numerals in the 100 series. Features of a control system are described with reference to FIGS. 13A and 13B, which use reference numerals in the 500 series.

Centralizer Baffles—

Figure 4A:
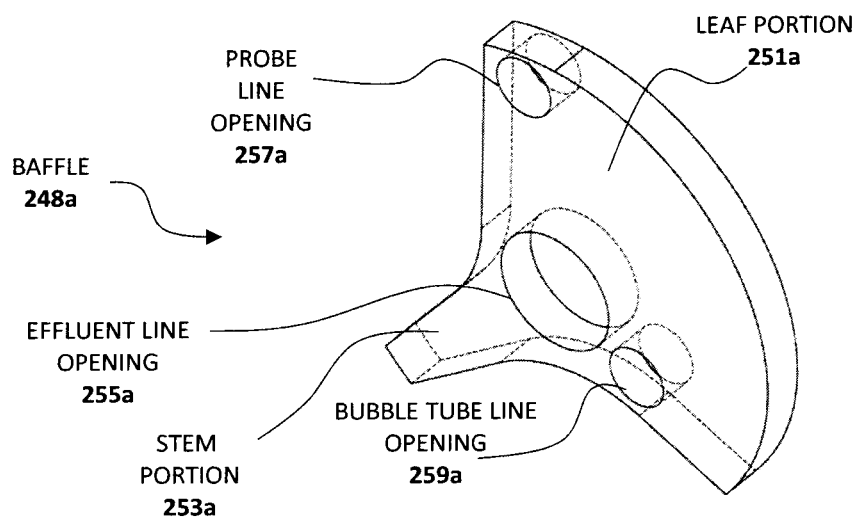
FIG. 4A is a perspective view of a leaf-shaped baffle 248*a* in accordance with one embodiment of the present invention, which has three openings 255*a*, 257*a* and 259*a* for insertion of an effluent line, a probe line and a bubble tube line, respectively.
Figure 4B:
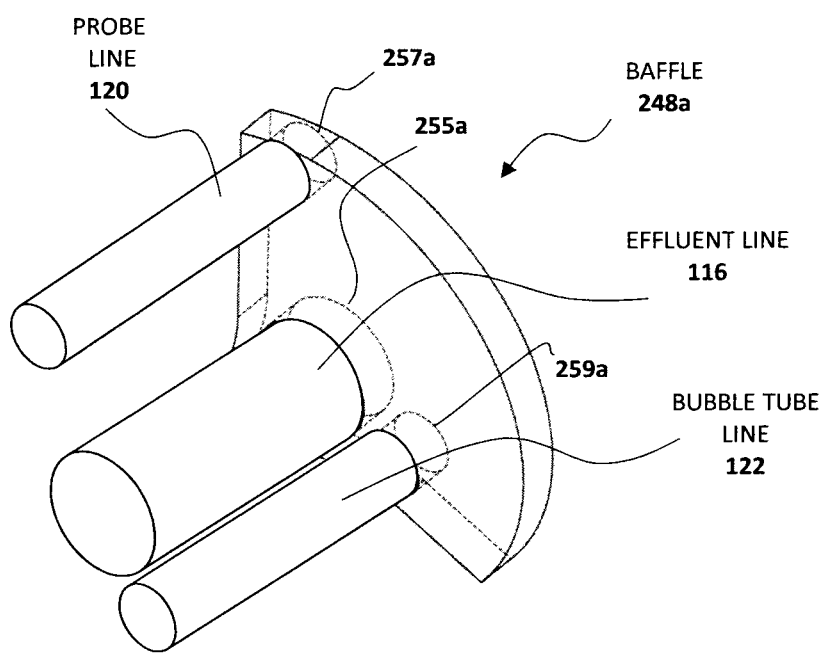
FIG. 4B is a perspective view of the same leaf-shaped baffle 248*a* shown in FIG. 4A showing protrusion of the effluent line 116, the probe line 120 and the bubble tube line 122.

As noted above with respect to the baffles 148a, 148b and 148c shown in FIGS. 1 and 3, it is advantageous to provide a means for attachment of the baffles to one or more of the lines that extend through the cavity 124. In certain preferred embodiments, these lines include the effluent line 116, probe line 120 and the bubble tube line 122 (there is no opening for the gas line 118 because it terminates just below the cap of the separator device and therefore baffles are not attached thereto). Accordingly, there is shown in FIGS. 4A and 4B, one embodiment of a single leaf-shaped baffle 248a with a leaf portion 251a a stem portion 253a and openings in the leaf portion 251a. The baffle 248a is dimensioned such that its total area is between about half to about two-thirds of the cross sectional area of the cavity, thereby providing a means to block upward movement of particulates such as silt and sand during the exhaust stroke.

The central opening 255a is dimensioned to accommodate the effluent line 116, the opening 259a to the right of the central opening 255a is dimensioned to accommodate the bubble tube line 122, and the opening 257a to the left of the central opening 255a is dimensioned to accommodate the probe line 120, as indicated in FIG. 4B where the probe line 120, the effluent line 116 and the bubble tube line 122 are shown extending from their respective openings 257a, 255a and 259a in the leaf portion 251a of the baffle 248a. It is to be understood that each of the lines 116, 120 and 122 is held in place by the baffle 248a and thus, a plurality of such baffles will provide the advantage of acting as centralizers to keep the lines straight within the cavity of the separator device.

Figure 5:
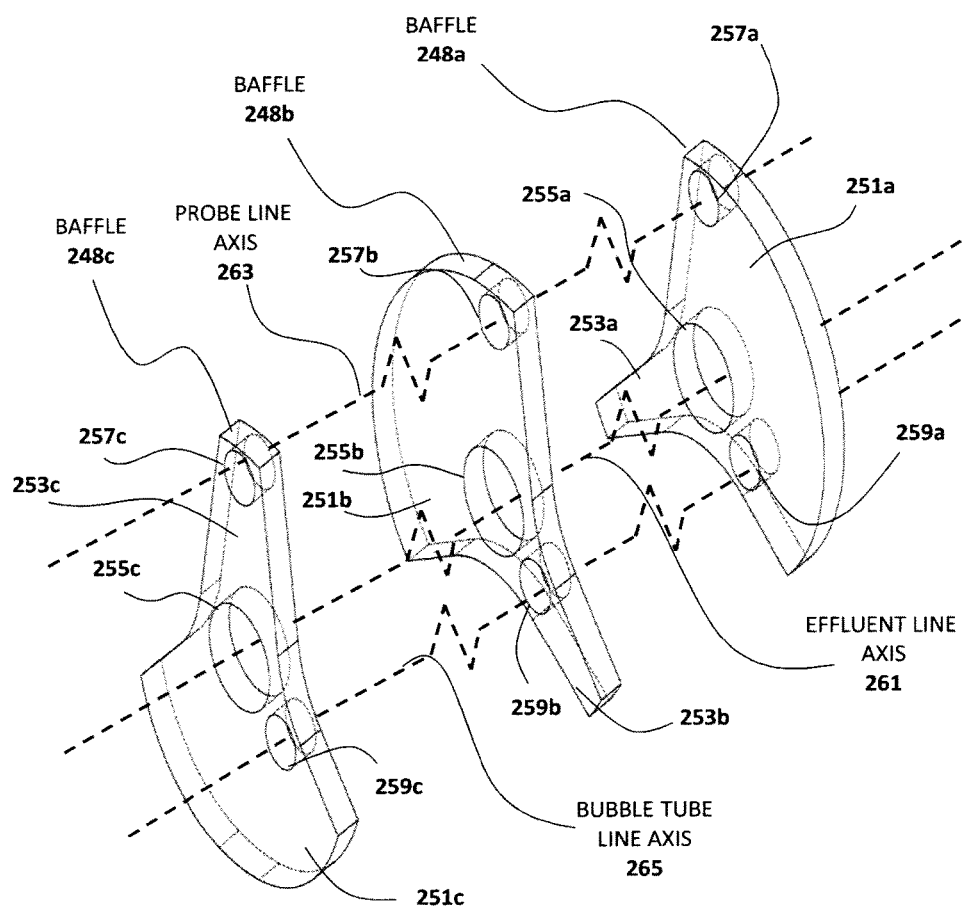
FIG. 5 is a perspective view of the orientation of a set of three baffles 248*a*, 248*b* and 248*c* showing the effluent line axis 261, the probe line axis 263 and the bubble tube line axis 265. It is seen that the baffles 248*a*, 248*b* and 248*c* are rotated with respect to each other to provide fluid flow restriction in the cavity of the separator device.
Figure 6A:
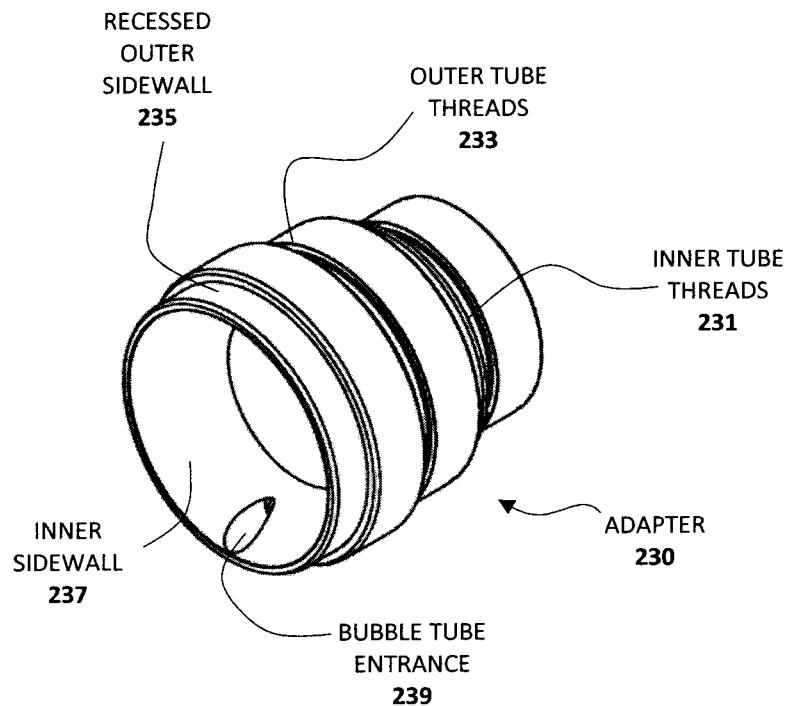
FIG. 6A is a perspective view of one embodiment of an adapter 230 for connection of concentric nesting cylinders to the bottom end of the separator device to accommodate the bubble tube line.
Figure 6B:
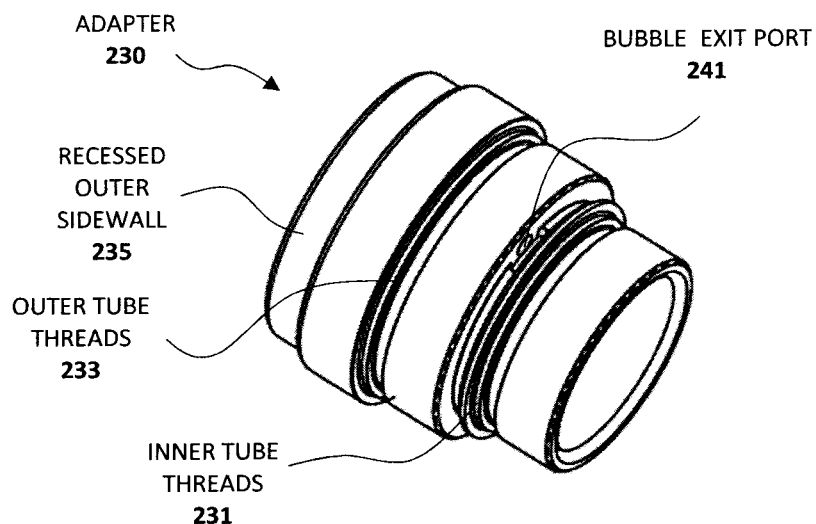
FIG. 6B is a second perspective view of the adapter embodiment 230 of FIG. 6A.

Referring now to FIG. 5, there is shown a set of three non-identical baffles 248a, 248b and 248c. Each of these baffles differs from the others in the placement of their respective openings 255a-c, 257a-c and 259a-c. For example, it is seen in baffle 248a that all of the openings 255a, 257a and 259a are located in the leaf portion 251a. In contrast, baffle 248b has the bubble tube line opening 259b in the stem portion 253b and baffle 248c has the probe line opening 257b in the stem portion 253c.

The different placement of the openings 255a-c, 257a-c and 259a-c of each baffle 248a-c is provided because it is advantageous to rotate each baffle 248a, 248b and 248c with respect to the longitudinal axis of the separator device body. This arrangement is seen when the baffles are viewed with respect to the axes of the three lines 116 (effluent line axis 261), 120 (probe line axis 263) and 122 (bubble tube line axis 265) in FIG. 5, where it is seen that each of the leaf portions 251a, 251b and 251c provides staggered blockage of the cavity of the separator device in order to slow the upward movement of particulates in the fluid from rising at the same rate as the fluid level to facilitate removal of the particulates from the separator device via the effluent line 116 during the compression stroke of the separator device.

It is advantageous in certain embodiments to place the baffles such that there is approximately equal spacing between pairs of adjacent baffles. In one preferred embodiment, the separator device body is about 217.25 inches long and adjacent pairs of baffles are separated from each other in the cavity at a distance of about 71 inches with the lowest baffle located about 52.75 inches above bottom end of the separator device body.

While this preferred embodiment provides a set of baffles 248a, 248b and 248c configured to hold three lines in the cavity 124, the skilled person will appreciate that alternative baffle sets may be provided which are configured differently. For example, in alternative separator device embodiments which do not include a bubble tube line, the baffles may be configured to be supported by only the effluent line 116 or only the probe line 120 or by both the effluent line 116 and the probe line 120. Furthermore, the baffle set shown in FIG. 5 may be modified to include additional or fewer baffles or may be used in the alternative embodiment when a bubble tube line is not included in the separator device. All of these alternative embodiments are within the scope of the invention.

The skilled person will also appreciate that baffles may also be provided in shapes other than the leaf shape described in the embodiment of FIGS. 4 and 5. Separator devices constructed according to the principles of the present invention and provided with baffle sets having alternative square, circular or oval shapes are also within the scope of the invention.

Adapter for Connection of Nested Tubes and Bubble Tube Line—

As described hereinabove with respect to FIGS. 3A and 3B, in a preferred embodiment, the bottom of the separator device 110 includes nested tubes 132 and 134 which are connected to the bottom end of the separator device body 112 using a hollow adapter 130. A specific adapter embodiment 230 is illustrated in two perspective views in FIGS. 6A and 6B and showing the connections to the nested tubes 132 and 134 in FIG. 7. It is seen that the adapter 230 includes a narrow portion provided with inner tube threads 231 for connecting the inner tube 132 and an intermediate wider portion with outer tube threads 233 for connecting the outer tube 134. The adapter 230 is also provided with a recessed outer sidewall 235 at its upper end. This recessed outer sidewall 235 is dimensioned to reside within the lower end of the cavity 124 of the separator device body 112. This recessed outer sidewall 235 may be provided with threads for connection to the lower end of the separator device body 112 (if the inner sidewall of the lower end of the body 112 is likewise provided with appropriate mating threads) or the connection of the adapter 230 to the body 112 may be made permanent by welding.

The inner sidewall 237 of the adapter 230 is provided with an opening designated herein as the bubble tube entrance 239 (see FIG. 6A) which holds the bubble tube line 122 in place. The bubble tube entrance 239 leads to a channel in the inner sidewall 237 of the adapter 230 which ends in an intermediate opening designated herein as the bubble exit port 241. Because the bubble exit port 241 is located at an intermediate position between the inner tube threads 231 and the outer tube threads 233, when the nested tubes 134 and 132 are connected to their respective threads 231 and 233, the bubble exit port 241 is located in the space between the inner tube 134 and the outer tube 132.

Figure 7:
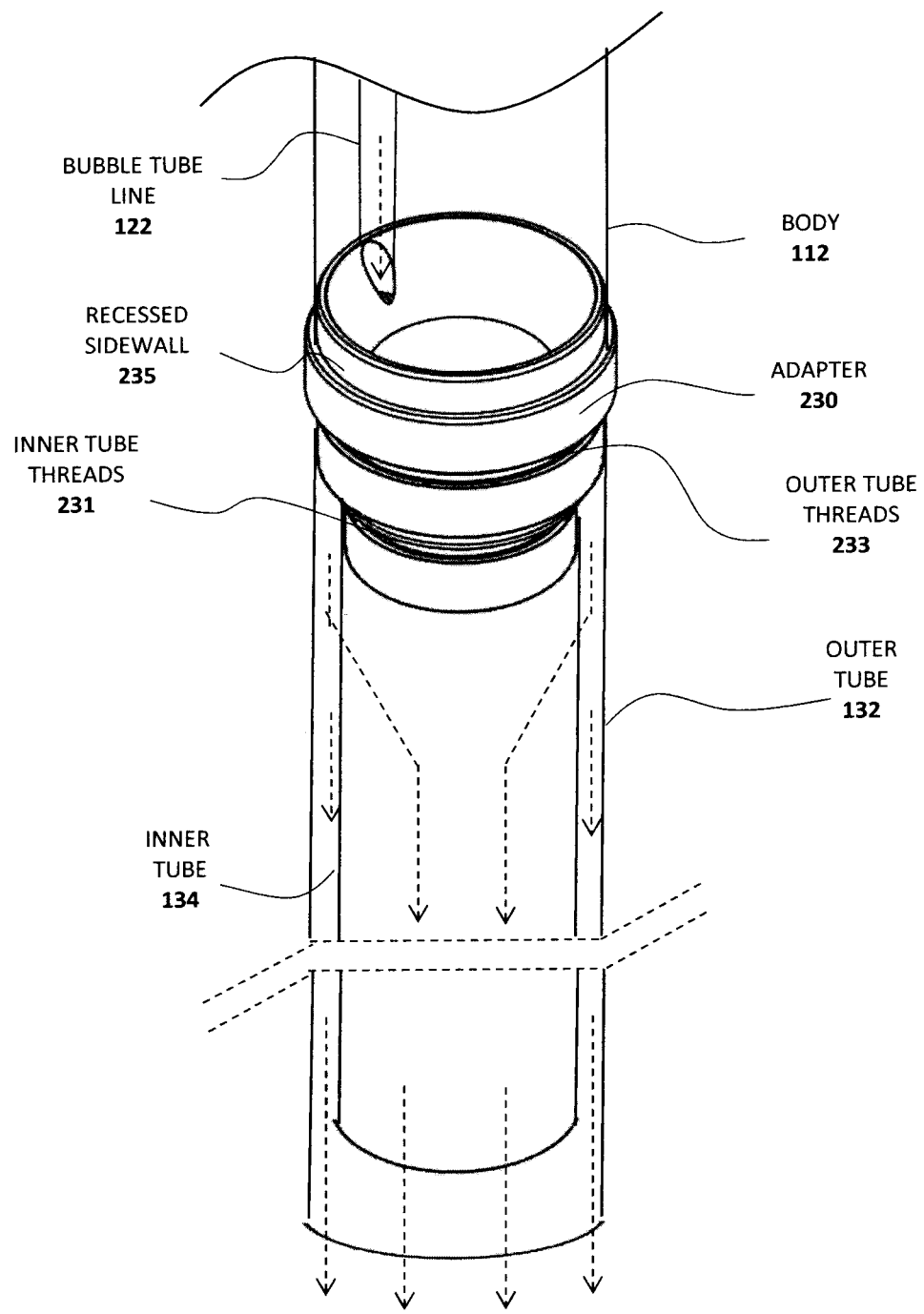
FIG. 7 is a perspective view of the adapter embodiment 230 of FIGS. 6A and 6B shown with the upper ends of the concentric nesting cylinders 132 and 134 and the lower end of the separator device body 112 and bubble tube line 122 connected thereto.

As indicated by the dashed arrows in FIG. 7, the provision of the bubble exit port 241 between the nested tubes 132 and 134 provides enhanced uniformity of flow of high pressure gas into the bottom of the separator device 110 because the flow of gas from the bubble tube entering the space between the outer sidewall of the inner tube 134 and the inner sidewall of the outer tube 132 becomes dispersed around the circumference of the bottom of the separator device 110. This is particularly advantageous for uniform cleaning of the separator device 110 and the annulus of the well.

Control Ball Valves—

Figure 8:
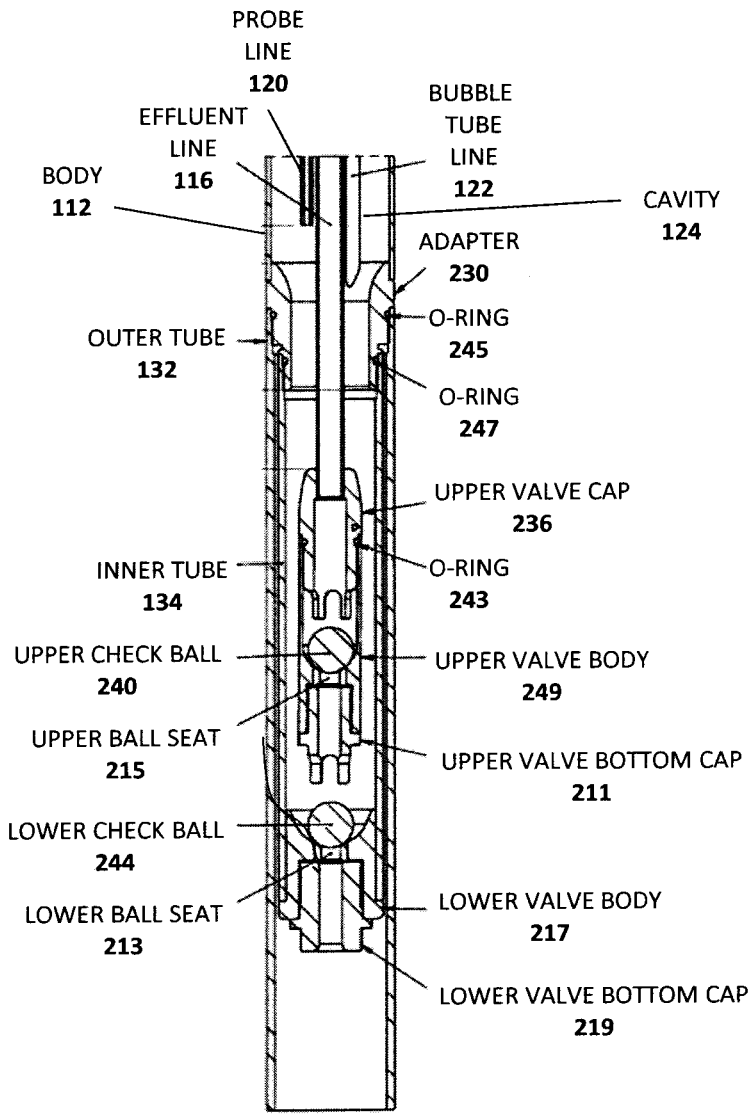
FIG. 8 is a cross-sectional view of a bottom portion of one embodiment of the separator device showing detail of the valves residing in the inner cavity 124.

As described hereinabove, the separator device includes a pair of valves which control the movement of fluid during the compression and exhaust strokes. During the compression stroke, the lower valve is closed and the upper valve is open to force fluid up into the effluent line and out of the well. During the exhaust stroke, the lower valve is open and the upper valve is closed to allow fluid to infiltrate into the separator device cavity. In one preferred embodiment, both valves reside within the inner tube of the nested tubes described above. A cross sectional illustration of this arrangement is shown in FIG. 8 which also shows how the bottom end of the separator device body 112 is connected to the adapter 230. The probe line 120, the effluent line 116 and the bubble tube line 122 are shown inside the cavity 124. The outer tube 132 and the inner tube 134 are connected to the lower end of the adapter 230 with additional sealing provided by o-rings 245 and 247, respectively.

It is further seen in the embodiment of FIG. 8 that the effluent line 116 extends through the cavity of the adapter 230 into the cavity of the inner tube 134. The end of the effluent line 116 is attached to the upper valve cap 236 and the upper valve body 249 with an intervening o-ring 243. The upper check ball 240 rests in the curved upper ball seat 215 at the bottom of the upper valve body 249. The bottom of the upper valve is provided with an upper valve bottom cap 211 which has an opening that permits entry of fluid during the exhaust stroke of the separator device.

The lower valve body 217 is fixed to the bottom end of the inner tube 134. The lower valve body 217 includes a curved lower ball seat 213 and the lower check ball 244 sits in the lower ball seat 213 when the valve is closed during the compression stroke of the separator device. The lower valve body 217 has a lower valve bottom cap 219 attached thereto, which has an opening that permits entry of fluid into the cavity during the exhaust stroke of the separator device.

In certain embodiments, both check balls are constructed of polyethylene or other material with similar properties and their respective seats are identically constructed of ceramic material, or other material with similar properties.

Wellhead—

According to certain aspects of the invention, the separator device system includes a wellhead for preservation of well pressure and reinforced support of the lines required for operation of the separator device. As described hereinabove, the bubble tube line 122 is optional in certain embodiments of the separator device. However, in FIGS. 9A to 9E which illustrate various views of one embodiment of a wellhead 268 which is configured to hold a bubble tube line 122 as well as the effluent line 116, the gas line 118 and the probe line 120.

Figure 9A:
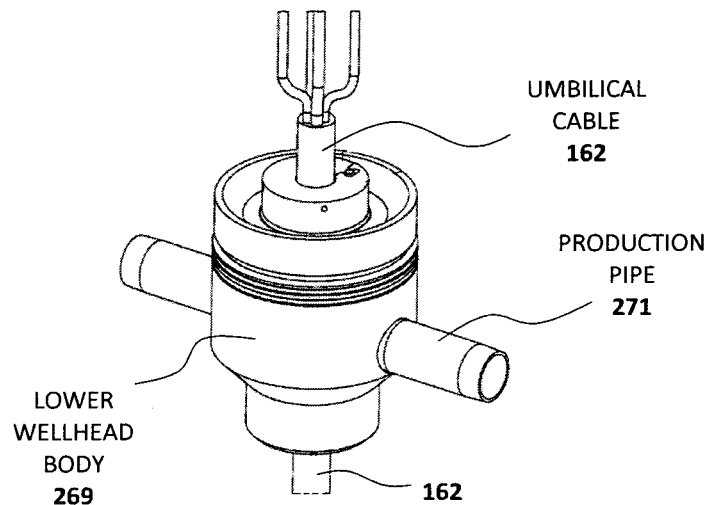
FIG. 9A is a perspective view of a lower wellhead body 269 of a partially assembled wellhead showing the separation of lines from the umbilical cable 162 according to one embodiment of the invention.

FIG. 9A shows a perspective view of a partially constructed wellhead consisting of a lower wellhead body 269 with a production pipe 271 extending therethrough. The production pipe 271 is open to a gas pipeline and provides a passage of produced gas to the gas pipeline (not shown) which leads away from the well. It is also seen in FIG. 9A that the umbilical cable 162 extends into the space above the lower wellhead body 269 and the four lines contained in the umbilical cable 162 are separated.

Figure 9B:
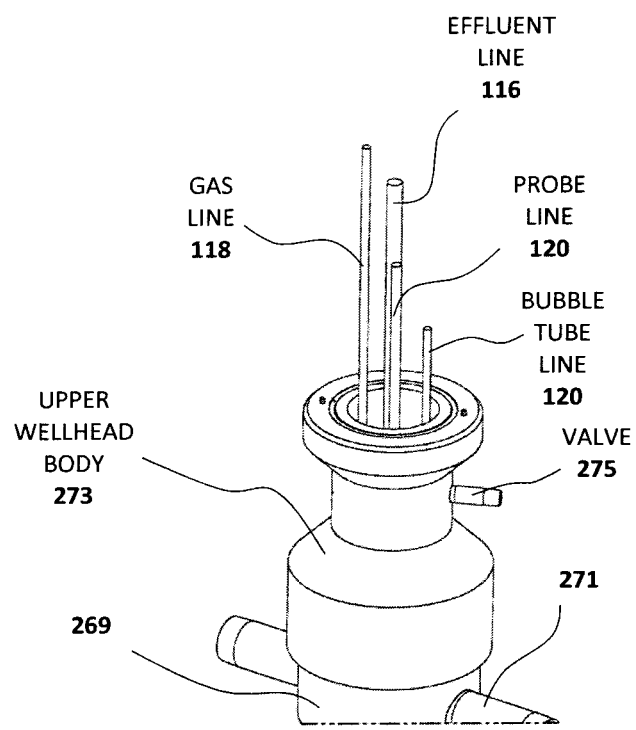
FIG. 9B is a perspective view of a partially assembled wellhead with an upper wellhead body 273 attached to the lower wellhead body 269 and showing the four separate lines 116, 118, 120 and 122 extending from the upper wellhead body 273.

FIG. 9B shows a perspective view of the partially constructed wellhead after installation of an upper wellhead body 273 on top of the lower wellhead body 269. The four separated lines (116, 118, 120 and 122) extend from the open top of the upper wellhead body 273. Also shown in FIG. 9B is a side valve 275 in the upper wellhead body 273. The purpose of the side valve 275 is to provide a means for bleeding any excess pressure or fluid buildup in the upper well body 273 which could occur in the event of fluid or gas leaks within the cavity of the upper wellhead body 273. The upper wellhead body 273 contains a polyurethane seal to isolate the umbilical cable 162 from the umbilical slips and allow gas production to flow from the umbilical cable and casing annulus via the valve installed on the production pipe 271 into the metering system in the wellhead valve box (not shown). The upper wellhead body 273 contains the well's flowing and shut in pressure in a closed system when the separator device is filling with reservoir fluid during the exhaust stroke.

Figure 9C:
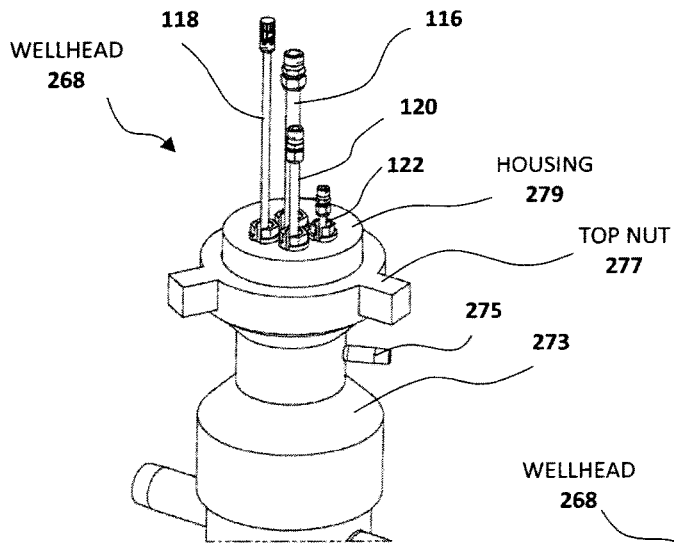
FIG. 9C is a perspective view of an assembled wellhead 268 covered by a housing 279 and top nut 277.

FIG. 9C shows a perspective view of the completed wellhead 268. Additional components added in this view are a housing 279 which is provided with channels to accommodate the upwardly extending lines 116, 118, 120 and 122. A top nut 277 is placed over the housing 279 and is threaded thereto. Each individual line is provided with a sealing element and a connector for connection to outwardly extending lines for conveyance of electricity, pressurized gas, bubble tube gas and effluent.

Figure 9D:
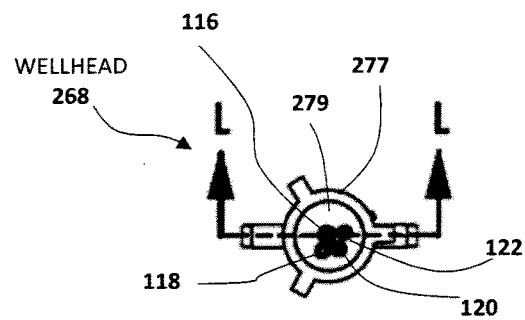
FIG. 9D is a top view of the housing 279, top nut 277 of the wellhead 268 and the four separate lines 116, 118, 120 and 122.
Figure 9E:
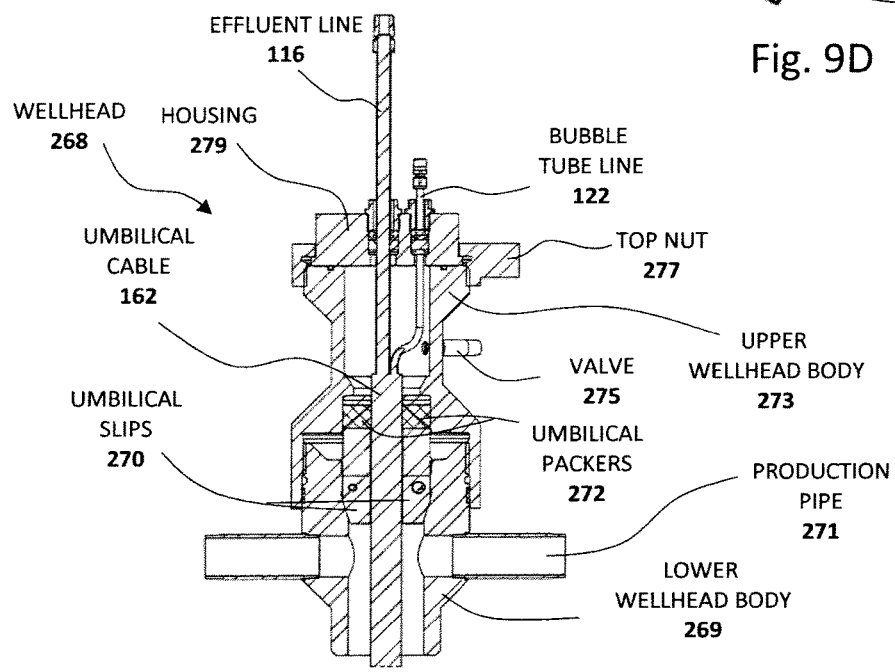
FIG. 9E is a cross sectional view of the wellhead 268 taken across line L-L of FIG. 9D.

FIG. 9D shows a top view of the wellhead for the purpose of indicating a cross section along lines L-L of the wellhead. The cross section is shown in FIG. 9E. This cross section shows the umbilical cable 162 extending through the wellhead and separating into the effluent line 116 and the bubble tube line 122. These lines extend out of the top of the wellhead 268 through respective channels in the housing 279. It is seen that within the cavity of the upper wellhead body 273 the effluent line 116 and the bubble tube line 122 are sheathed in the umbilical cable 162, which is supported by a set of umbilical slips 270 and umbilical packers 272. The umbilical slips 281 are located within and are retained by the inner sidewall of the lower wellhead body 271 and are provided with inner ridges to form a stronger gripping interface with the outer sheath of the umbilical cable 162. The umbilical packers 272 reside within the upper wellhead body 273 and provide an additional sealing feature to prevent loss of fluid or gas from the wellhead 268 if leaks occur below the wellhead 268.

In this particular embodiment, lines 116, 118, 120 and 122 are sealed separately in housing 279 to act as a redundant seal in case of failure of the polyurethane seal between the umbilical cable 162 downhole at the top of the separator device and the fishing neck fails and allows fugitive gas to travel up the umbilical cable in the space between the lines 116, 118, 120 and 122. These lines are roped and twisted during the manufacturing process of umbilical cable 162 and then a polyethylene jacket is applied. Each individual line is sealed because, in some embodiments there is sufficient free space between the lines to allow produced gas to travel to the surface and be released to the environment. Valve 275 on the upper wellhead 273 can be opened periodically to verify that bottom seals remain intact. Normally the pressure in the upper wellhead body cavity is zero.

In certain embodiments, the wellhead is compatible with injection of a 1.625 inch umbilical cable into the well for deployment and operation of the separator device system into the well. In certain embodiments the wellhead is rated for 600 ANSI and appropriate for gas wells having a surface pressure up to 1,440 psi.

In certain embodiments, the umbilical packer units 272 are further provided with sealing features to retain a sealed wellhead in the event of leakage of gas or fluid from fluid or gas lines below the wellhead.

Umbilical Cable—

Figure 10:
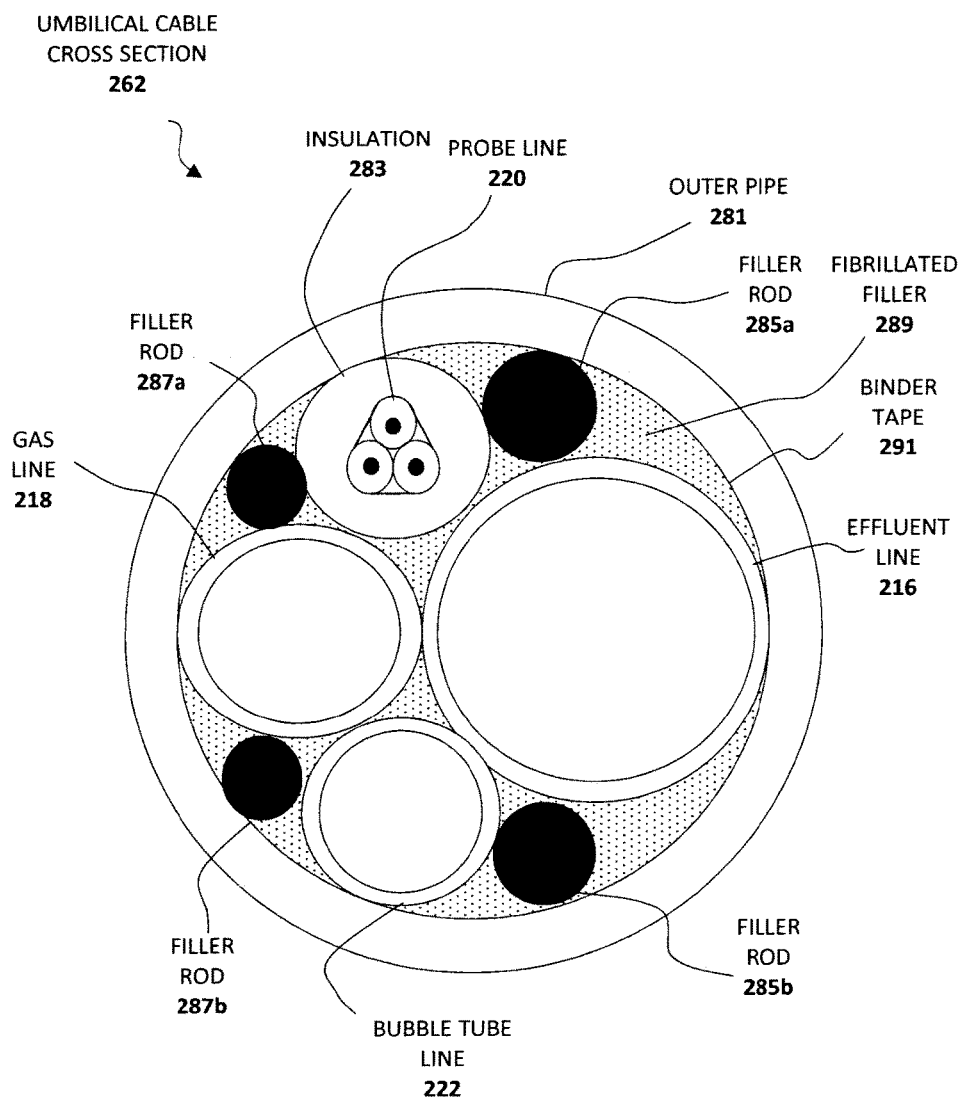
FIG. 10 is a cross section of one embodiment of an umbilical cable 262.

One embodiment of the umbilical cable is shown in FIG. 10 in cross section. The outer body of this particular embodiment of the umbilical cable is a flexible sheath formed of high density polyethylene with an outer diameter of about 1.625 inches. This embodiment of the umbilical cable 262 holds a stainless steel effluent line 216 with an outer diameter of about 0.75 inches, a stainless steel gas line 218 with an outer diameter of about 0.5 inches, a probe line 220 covered with insulation of cross-linked polyethylene with a polyurethane jacket to an outer diameter of about 0.393 inches, and a stainless steel bubble tube line 222 with an outer diameter of about 0.375 inches.

To enhance the rigidity of the umbilical cable 262 for protection against the forces of high pressure gas, four filler rods 285a, 285b, 287a and 287b are provided to partially fill the spaces between the effluent line 216, the gas line 218, the probe line 220 and the bubble tube line 222. In this embodiment, the two large diameter filler rods 285a and 285b have outer diameters of about 0.24 inches and the two smaller diameter filler rods 287a and 287b have outer diameters of 0.18 inches. In this embodiment the filler rods are formed of twisted polypropylene. The remaining space of the cavity of the umbilical cable 262 is occupied by fibrillated polypropylene filler 289. Advantageously, a binder tape 291 is provided between the outer surface of the fibrillated filler 289 and the inner surface of the outer sheath 281.

This embodiment of the umbilical cable is designed to protect the functional lines within the cable from the high pressure of gas infiltration into the annulus of the well from the perforations of the well and from high pressure gas injected through the bubble tube line 222 during a cleaning operation. In addition, significant force is imparted within the separator cavity during the transition from the compression stroke to the exhaust stroke. The lines and filler rods of this embodiment of the umbilical cable 262 are twisted in a helical pattern along the length of the umbilical cable 262 to enhance the rigidity of the cable.

Connectors for the Effluent Line, the Gas Line and the Bubble Tube Line—

The inventor of the present invention has recognized that operation of downhole equipment in a typical liquid-loaded gas well increases the chances that such equipment will become stuck in the well from time to time due to the volumes of silt and sand present in the well. With respect to certain embodiments of the separator device of the present invention, the inventor has also recognized that the presence of integrally connected equipment above the separator and extending to the surface, would complicate fishing operations aimed at removing the separator from the well if and when it becomes stuck. Therefore, certain embodiments of the invention include provision of the probe line, the gas line, the effluent line and the bubble tube line each in two parts with connections made a location above the cap of the separator and below the umbilical cable, as shown in a general manner by connectors 152, 154, 156 and 158 of FIG. 1. A means for conveniently disconnecting these lines above the separator body to allow withdrawal of the lines prior to initiation of fishing operations is also included in some embodiments.

It is readily seen in FIG. 1 that each of the four functional lines 116, 118, 120 and 122 emanates from the umbilical cable 162 within the protective pipe 160 which is covered at its uphole end by a transition piece 164. Connectors 152, 154, 156 and 158 are provided to make connections with corresponding lines located above the cap 114 of the separator device 110 when the separator system 100 is deployed in a well. In one particular embodiment, the group of separators is provided with at least one connector having a weak point which, when disengaged, allows all four of the functional lines extending above the separator device to be disengaged from the separator above the cap 114 of the separator 110. This allows deployment of fishing equipment to retrieve the separator device. (In one embodiment, shown in FIG. 1, the separator device 110 is provided with a fishing neck 166 which provides a position configured for connection of fishing equipment for retrieval of the separator device 110).

In one embodiment, the weak point connection is made at any one or more of the effluent line, the gas line and the bubble tube line which in some embodiments are each represented by a rigid pipe constructed of stainless steel or other material with similar properties. In one embodiment, the probe line is represented by a combination of three wires wrapped in insulation, as indicated for example, in FIG. 10. Embodiments for connection of upper and lower parts of the probe line will be described in more detail hereinbelow.

One embodiment of a connector system having a weak point and designed for bridging an upper rigid pipe and a lower rigid pipe is shown in FIGS. 11A to 11D and is illustrated as bridging an upper effluent line 116a and a lower effluent line 116b. The skilled person will recognize that the same connector system may also be used to connect upper and lower parts of the gas line and/or the bubble tube line (lines with different diameters will require receptacles with different diameters. The connector system includes an upper receptacle 221a permanently attached by welding, for example, to the upper effluent line 116a and a lower receptacle 221b similarly attached to the lower effluent line 116b. The connector system further includes a female connector 226 configured for installation into the lower receptacle 221b by threading therewithin. Likewise, a male connector 223 is configured for installation into the upper receptacle 221a by threading therewithin. In certain embodiments, the threading system may be provided by a Swagelok threading arrangement.

Figure 11A:
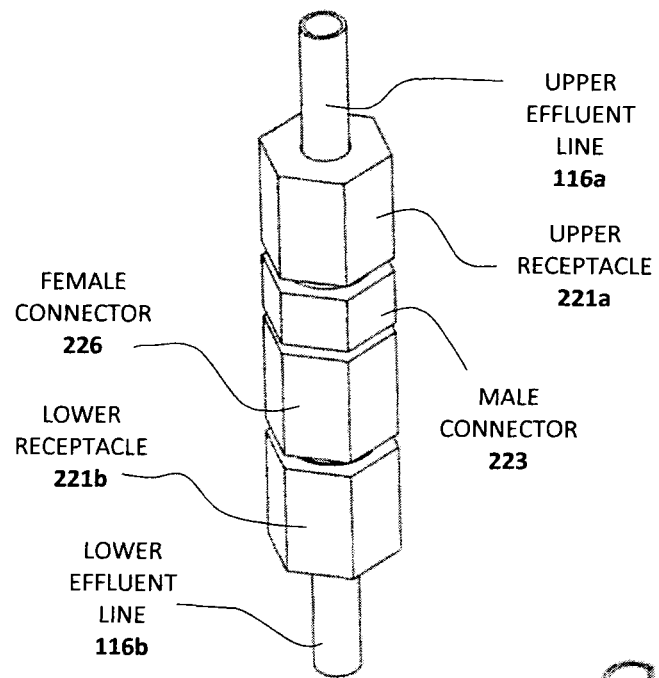
FIG. 11A is a perspective view of one embodiment of a connector system for connecting two parts of an effluent line 116a and 116b.
Figure 11B:
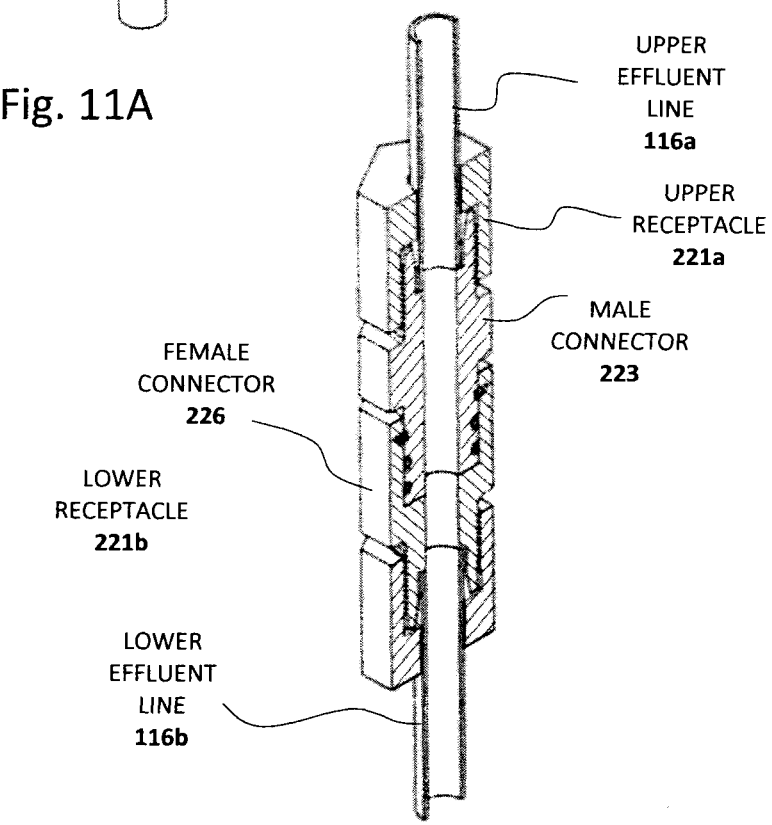
FIG. 11B is perspective view of a cross section of the connector system embodiment of FIG. 12A.
Figure 11C:
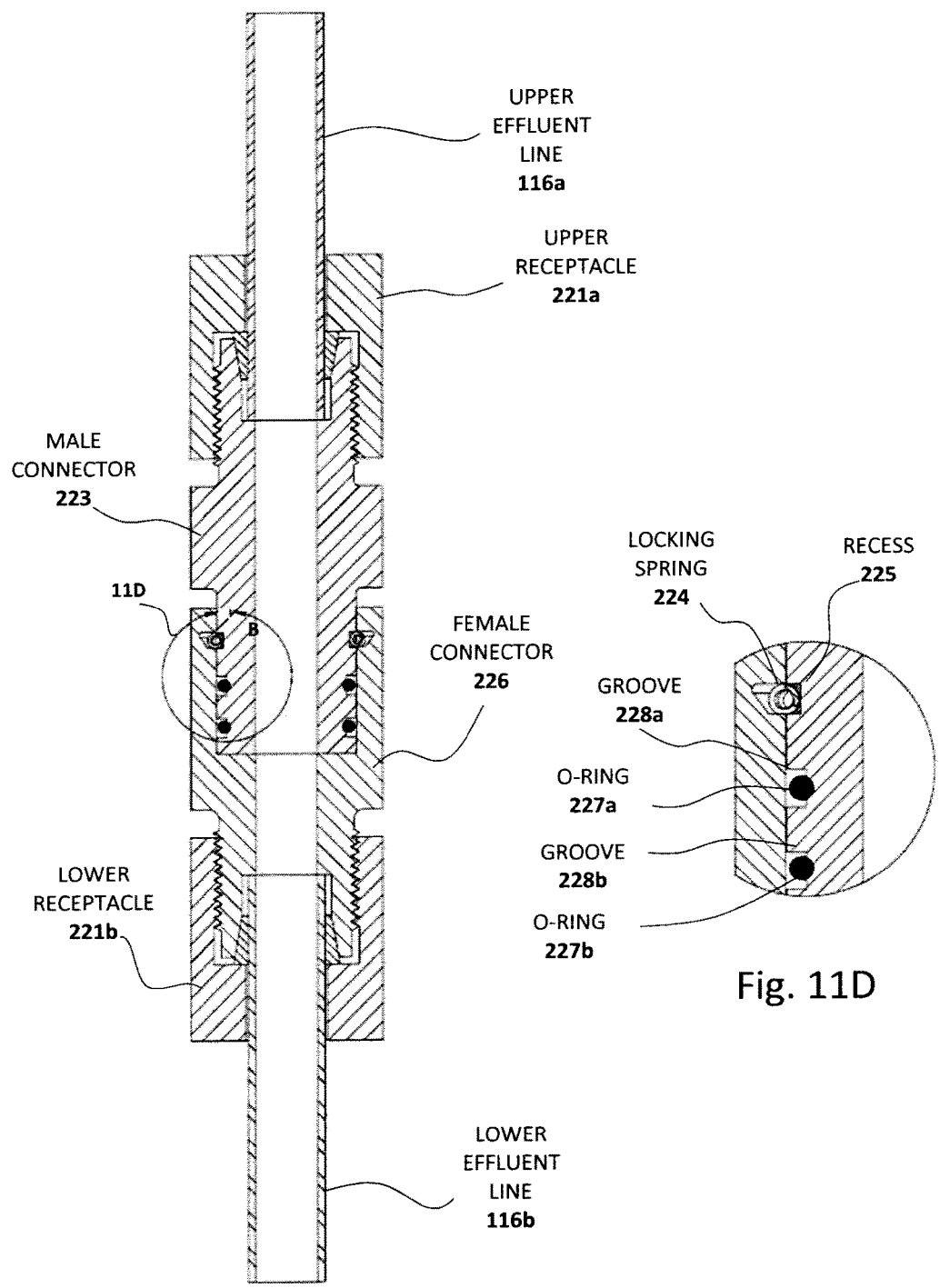
FIG. 11C is a cross sectional view of the same embodiment of FIGS. 12A and 12B.

The lower end of the male connector 223 fits into the wider lower opening of the female connector 226 as best seen in FIGS. 11B and 11C. As shown in FIGS. 11C and 11D, the inner sidewall of the female connector 226 has a recess 225 that receives an adjustable locking spring 224 installed in the male connector 223 to provide a locking arrangement of the connection of the upper effluent line 116a to the lower effluent line 116b. A pre-determined withdrawal force causing deformation of the spring by withdrawing the upper effluent line 116a at a pre-determined sufficient force disengages the locking spring 224 from the recess 225 and allows the upper effluent line 116a to be separated from the lower effluent line 116b. In certain embodiments where the separator device is deployed at a depth of about one thousand meters, the locking spring 224 is set to disengage from the female connector 226 when the withdrawal force is about 7,000 pounds. This force limit will vary according to the depth of deployment of the separator device.

This embodiment also contains a means of sealing the connection. The sealing means of this embodiment is provided by a pair of o-rings 227a and 227b which reside in a pair of corresponding grooves 228a and 228b formed in the outer sidewall of the male connector 223.

As noted above, the purpose of separating the functional lines above the separator device is to facilitate their withdrawal prior to conducting a fishing operation to remove the separator device from the well. It is advantageous to make the process of disengagement of the upper lines from the lower lines as simple as possible. Therefore, in certain embodiments, the same connector system is used to connect the upper effluent line, the upper gas line and the upper bubble tube line to their respective lower lines (providing three separator systems for connecting upper and lower parts of the effluent line, the gas line and the bubble tube line). However, it is advantageous to provide only a single weak point because all three lines are removed simultaneously at a constant rate by a coiled tubing injector which grips and withdraws the umbilical cable within which they reside. Therefore, the locking spring and corresponding recess is omitted from two of the three connector systems used. In one such embodiment, only the effluent line is provided with the locking spring system, as shown in FIGS. 11B to 11D. This would avoid the possibility of having multiple weak points set at different disengagement limits. Therefore, in a situation where the upper lines are being removed from the well, as soon as the predetermined withdrawal force is exerted on all three of the lines (by pulling on the umbilical cable) the locking spring in the connector system of the effluent line will disengage and all three connector systems will then be disconnected simultaneously, leaving only the separator device in the well. In this embodiment and similar embodiments, the receptacle threading systems must be configured to withstand the predetermined pressure, otherwise the male and/or female connectors would become disengaged from the receptacle threading systems before the locking spring mechanism.

Probes—

As noted above, the probes are provided to sense the presence of fluid levels initiate transitions between compression strokes, where fluid is forced out of the separator via the effluent line, and the exhaust strokes, where the level of fluid rises in the separator device and gas is exhausted via the gas line.

In one embodiment, electrical grounding and ungrounding of the probes initiates the transitions. Thus, during normal cycling of the separator device, when fluid reaches the upper probe, it grounds the probe and initiates the compression stroke. When fluid passes just below the lower probe, this probe is ungrounded and the exhaust stroke is initiated. Like the connectors for the effluent line, the gas line and the bubble tube line described above, it is advantageous to provide a means for conveniently engaging and disengaging the probes from the probe line so that the upper probe line (the majority of which also resides in the umbilical cable), can be withdrawn at the same time as the other upper lines, as required.

Figure 12:
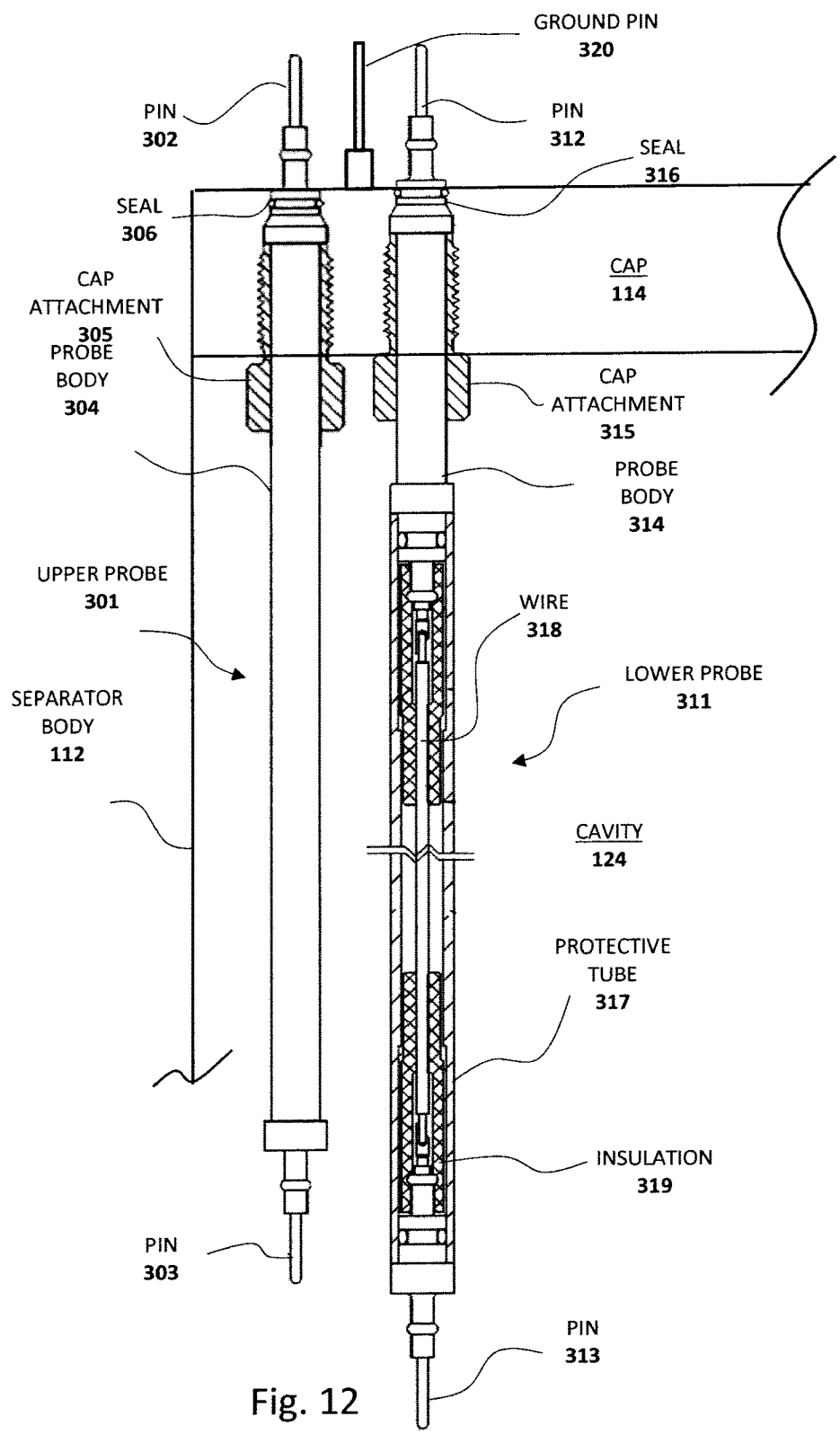
FIG. 12 is a cross section of one embodiment of a pair of probes 301 and 311, shown in association with the cap 114 of the separator device.

In certain embodiments, the probe line connector system is distinct from the gas and fluid line connectors described above. One example embodiment of a pair of probes is shown in FIG. 12 with components identified using reference numerals in the 300 series in association with general components of a separator device identified using reference numerals in the 100 series. There is an upper probe 301 and a lower probe 311 shown in association with the cap 114 of the separator device. The probes 301 and 311 are similarly constructed but have different lengths with the lower probe 311 being longer than the upper probe 301 as shown. The upper ends of both probes 301 and 311, have conducting pins 302, 312 extending outward from the cap 114. These pins are used to make plug-in electrical connections with the upper probe line (not shown). Advantageously in this particular embodiment, the connection of the pins 302, 312 of the probes 301, 311 to the upper probe line emanating from the umbilical cable (not shown) is made using a protective boot covering to protect the connection from moisture. The protective boot structure contains a mating receptacle for each of the pins 302, 312 to form the electrical connection with the upper probe line.

One embodiment of the boot structure (not shown) is a Y-shaped boot (not shown) constructed of rubber or other insulating protective material which is then connected to the individual wires emanating from the umbilical cable (not shown). This Y-shaped structure is reversibly connectable to the pins 302, 312 in a plug-in arrangement. In certain embodiments, the protective boot is a Y-shaped Kemlon K16 protector boot (Kemlon, Pearland, Tex., USA; www.kemlon.com). Advantageously, this probe arrangement is resistant to pressures as high as 20,000 psi. The protective boot structure also provides for connection of a ground wire of the probe line to a ground pin 320 which is attached to the cap 114 to provide the grounding function required by the probes 301, 311.

In this particular embodiment, the probes 301 and 311 are installed within the body of the cap 114 of the separator device by threaded cap attachments 305, 315 which allow the upper pins 301, 311 to extend outward from the cavity 124 of the body 112 of the separator device. As such, both probes are conveniently threaded to the cap 114 before the cap 114 is connected to the body 112 of the separator device. The threaded cap attachments 305 and 315 are each provided with a corresponding seal 306, 316 such as an o-ring and are each provided with lower hex nut portions to allow up to about 85 foot-pounds of torque during tightening of the cap attachments 305 and 315 into the body of the cap 114 such that the upper pins 302 and 312 extend upward from the upper surface of the cap 114.

It is seen in FIG. 12 that the lower probe 311 has a total length greater than that of the connector body 304 of the upper probe 301 in order to place the lower probe near the bottom of the separator device where it defines the lower boundary of fluid level in the separator at the end of the compression stroke. Lower connector pins 303 and 313 are located at the lower termini of the connectors 301 and 311 are exposed for sending the presence of fluid.

In this particular embodiment, both probes 301 and 311 have rigid cylindrical bodies 304, 314 advantageously constructed of a corrosion-resistant alloy, such as Inconel or other similar material. Advantageously the threaded cap attachments 305 and 315 are formed of the same material as the probe bodies 304 and 314.

It is seen in FIG. 12 that the probe body 314 of the lower probe 311 is permanently attached (by electron beam welding for example) to a protective tube 317 such as a stainless steel tube, for example. This tube 317 is shown in cross section to show that the conducting wire 318 is held within the tube 317 and makes a connection to the lower pin 313. The interior of the tube 317 is provided with insulation 319. A similar arrangement exists in the upper probe 301 but is not shown in cross section in FIG. 12.

In one embodiment, the upper probe 301 has a total length of about 5.96 inches and the lower probe 311 has a total length of about 240 inches with the majority of its length provided by the protective tube 317 as shown. Additionally, the outer and inner diameters of the protective tube 317 are about 0.375 inches and about 0.25 inches, respectively.

Control System—

Figure 13A:
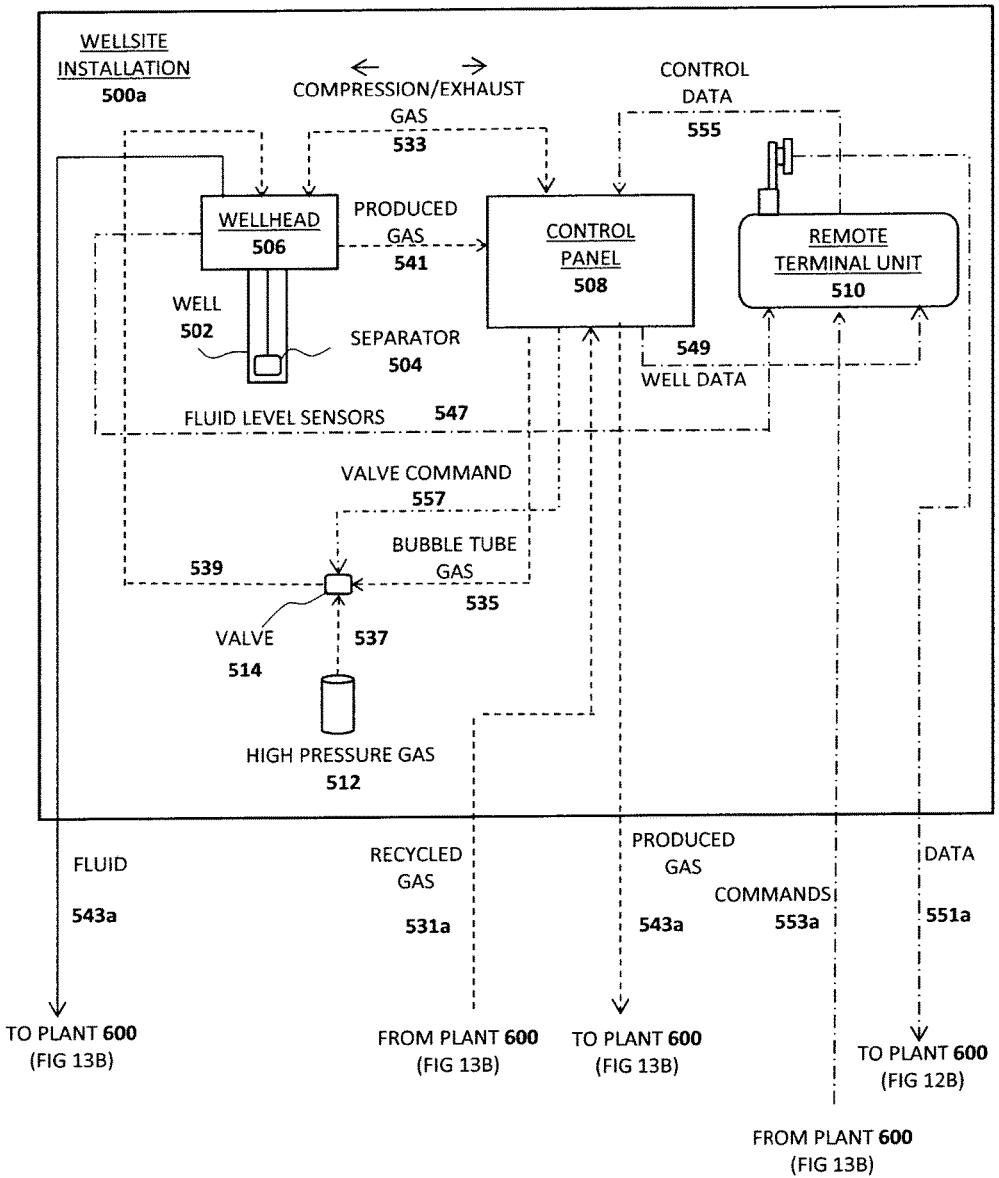
FIG. 13A is a flow diagram, which is continuous with FIG. 13B, of a control system in accordance with one embodiment, showing flow of gas, liquids and data between a separator installation 500a and a plant 600 (FIG. 13B).
Figure 13B:
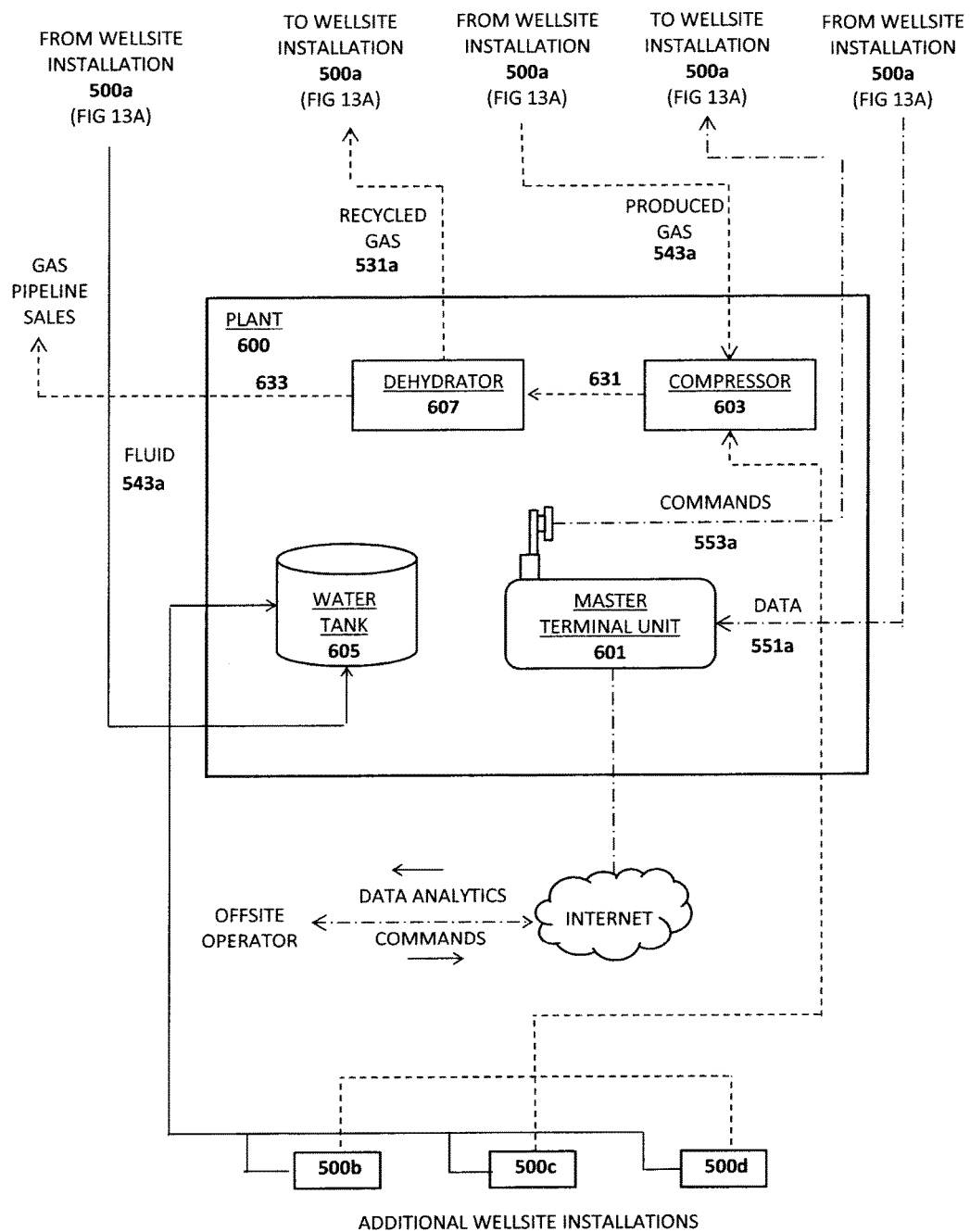
FIG. 13B is a schematic flow diagram, continuous with FIG. 13A, of a control system in accordance with one embodiment, showing flow of gas, liquids and data between a separator installation 500a (FIG. 13A) and a plant 600.

Certain embodiments of the invention include a control system. FIGS. 13A and 13B illustrate one embodiment of such a control system. In this illustration, the flow of gas is indicated by a dashed line, the flow of fluid is indicated by a solid line and the transmission of data is indicated by a dot-dashed line. The wellsite installation 500a of this particular embodiment includes a gas well 502 with a separator device 504 connected to a wellhead 506 and a data and valve control panel 508 connected thereto. The control panel 508 includes a series of valves and sensors that measure pressure and control the flow of gas to and from the separator 504 and measure the flow of fluid produced by the separator 504 during the separation process. The control panel 508 also measures the volumes of gas produced by the well 502. Data relating to the measurements described above are measured in the control panel 508. The wellsite installation 500a sends produced gas from the well 502 to the control panel 508 via gas conduit 541 and then to a compressor 603 at the plant 600 via conduit 543a. Data are collected at the control panel 508 and sent to the remote terminal unit 510 via data conduit 549 and then to the master terminal unit 601 at the plant 600 via conduit 551a.

The control panel 508 is in data communication with the remote terminal unit 510 which includes a transmitter for sending data to a master terminal unit 601 at the central plant 600. The master terminal unit 601 also has a transmitter for sending command instructions such as instructions to initiate separator cleaning operations and/or software updates to the remote terminal unit 510 for controlling or reprogramming the control panel 508.

One example of a command instruction is a remotely-generated instruction by the operator to over-ride the signal probes in the separator to immediately generate either a compression stroke or an exhaust stroke. Gas is obtained via delivery line 531a connected to the wellsite installation 500a from a compressor 603 at the plant 600 the water vapor is removed from the gas by a dehydrator 607 prior to being routed to the control panel 508 at the separator installation 500a via recycled gas delivery line 531a. When the separator is located at a depth of 1200 feet for example, the requirement for recycled gas requirement is 1 mscf/d for each 2 bfpd produced from the effluent line (this represents only a small fraction of the produced gas of the gas gathering network from additional wellsite installations 500a-d with the majority of the produced gas being sent for gas pipeline sales via conduit 633). In certain embodiments, there is a pressure sensor at the plant. If the gas recycle delivery line falls below a low pressure set point a valve opens and the compressor sends recycled gas back into the line, until the high pressure set point is reached and the delivery valve at the plant closes, waiting for the pressure in the system to fall and the cycle repeats itself.

The operator can initiate a cleaning cycle remotely using the bubble tube 504. In this example, the operator reviews production data sent from the remote terminal unit 510 to the master terminal unit 601 via radio 551a and relayed to the operator via the internet) and notes that the production at the well does not meet expectations. Suspecting that there is a blockage caused by clumping of particulates in the annulus of the well 502, the operator enters the instruction to initiate the manual bubble tube clean out valve stroke. This instruction is transmitted via radio 553a to the remote terminal unit 510 and then to the control panel 508. The command by the operator is initiated via conduit 557 to switch the constant flow of bubble tube gas provided by the compressor 603 to the separator 504 via conduits 535 and 539 to gas from a high pressure gas source 512. This is done by controlling a two-way valve 514 to draw from the high pressure gas source 512 via conduit 537. The high pressure gas is then sent to the bubble tube in the separator 504 via gas conduit 539. This high pressure gas emerges from the bubble tube at the bottom of the separator 504 and sweeps the annulus of the well 502 to remove the blockage.

Data collected at the control panel 508 and sent to the remote terminal unit 510 include, but are not necessarily limited to: downhole pressure measured using the bubble tube system, stroke cycles and fluid production volumes and rates, as well as gas production volumes and rates. Other sensors and regulators may be incorporated into the control panel 508 such as sensors for temperature and fluid density measurements. Such alternative embodiments may be constructed by the skilled person without undue experimentation. In certain embodiments, the operator may access the master terminal unit 601 at a remote location from the plant 600 via the internet (as shown in FIG. 13B). In this embodiment, the control system is used to control a plurality of additional wellsite installations 500b-d and alerts are provided to the operator only in the event that data transmitted from a particular separator installation indicates that its performance has dropped below a pre-determined threshold. The parameters defining optimal and suboptimal performance may be adjusted by the operator based on the operating history of any particular well. The skilled person will recognize that such parameters may vary significantly as a result of fluid loading rates, the volumes of particulates present in the fluid and the gas reserves at any particular wellsite installation. Software for analyzing separator performance is provided with data analytics that can be programmed by the skilled person without undue experimentation.

In this embodiment, produced gas from each of the additional wellsite installations 500b-d is sent to the compressor 603 at the plant 600 for subsequent dehydration, recycling and sales as shown. Additionally, fluid removed from the loaded wells is sent to the water tank 605. Although not shown to preserve clarity, recycled gas is sent to each of the additional wellsite installations 500b-d to drive the cycling of their respective separators and data and commands are transmitted and received at remote terminal units installed at each of the additional wellsite installations 500b-d.

In certain embodiments, gas produced from the well 502 is measured by a turbine meter and producing pressure by a transducer, the data is sent to the remote terminal unit 510 for digitizing prior to being sent to the master terminal unit 601. Surface gas pressure is compared to the bubble tube transducer pressure and used to calculate a fluid level. These data sets are also digitized in the remote terminal unit 510 prior to transmission to the master terminal unit 601.

In certain embodiments, the probes of the separator 504 are attached by a signal cable (conduit 547) directly into the remote terminal unit 510. When the separator cavity is full, the probes are grounded and a circuit in the remote terminal unit 510 sends a signal to a solenoid in the control panel 508, which in turn initiates the compression stroke. The remote terminal unit 510 receives this data, converts it to a fluid production volume and sends it to the master terminal unit 601.

The control panel 508 includes a micrometer delivering bubbles of gas to the bubble tube. The downhole pressure is measured by a pressure transducer located in the control panel 508 and the pressure data is sent to the remote terminal unit 510 and then to the master terminal unit 601 where it is subjected to calculations for rate transient analysis to assess the performance of the well 502. Additionally, the bubble tube pressure is compared to the casing gas producing pressure to calculate the fluid level. This data is also processed by the remote terminal unit 510 and transmitted to the master terminal unit 601.

In certain embodiments, the remote terminal unit 510 uses a radio and antenna to send all data to the master terminal unit 601. The master terminal unit 601 has software configured to provide an analysis of the performance of each of the separator installations in the separator network. The software calculates a production decline curve for each separator installation and is configured to provide an alert to the operator if the performance falls below a pre-determined sub-optimal level. The operator can then interpret the data and decide on actions to improve performance, such as the bubble tube cleaning operation described above.

As described above, the fluids and gases are conveyed to the plant 600 from the separator installations 500a-d. This significantly reduces the frequency for pipeline pigging and eliminates a requirement for trucking of fluids to the plant 600.

In some embodiments, the gas recycling line (exemplified by line 531*a* in FIGS. 13A and 13B), is a polyethylene tube which is provided with a braided polyester jacket between the tube and a sheathing material to enhance its resistance to the high pressure gas travelling in this line. In certain embodiments, this braided polyester jacket increases the polyethylene tube's resistance to bursting by a factor of about 10, thereby allowing gas to be carried in the tube at pressures in the vicinity of 1,000 psi. Advantageously, this gas recycling line is contained in a trench that extends from the plant 600 to the wellsite installation 500*a* and the trench also holds line 543*a* which carries effluent fluid from the wellsite installation 500*a* to the water tank 605 at the plant 600.

EXAMPLES

Example 1: Enhancement of Gas Production Rate in a Fluid-Loaded Gas Well

Figure 14:
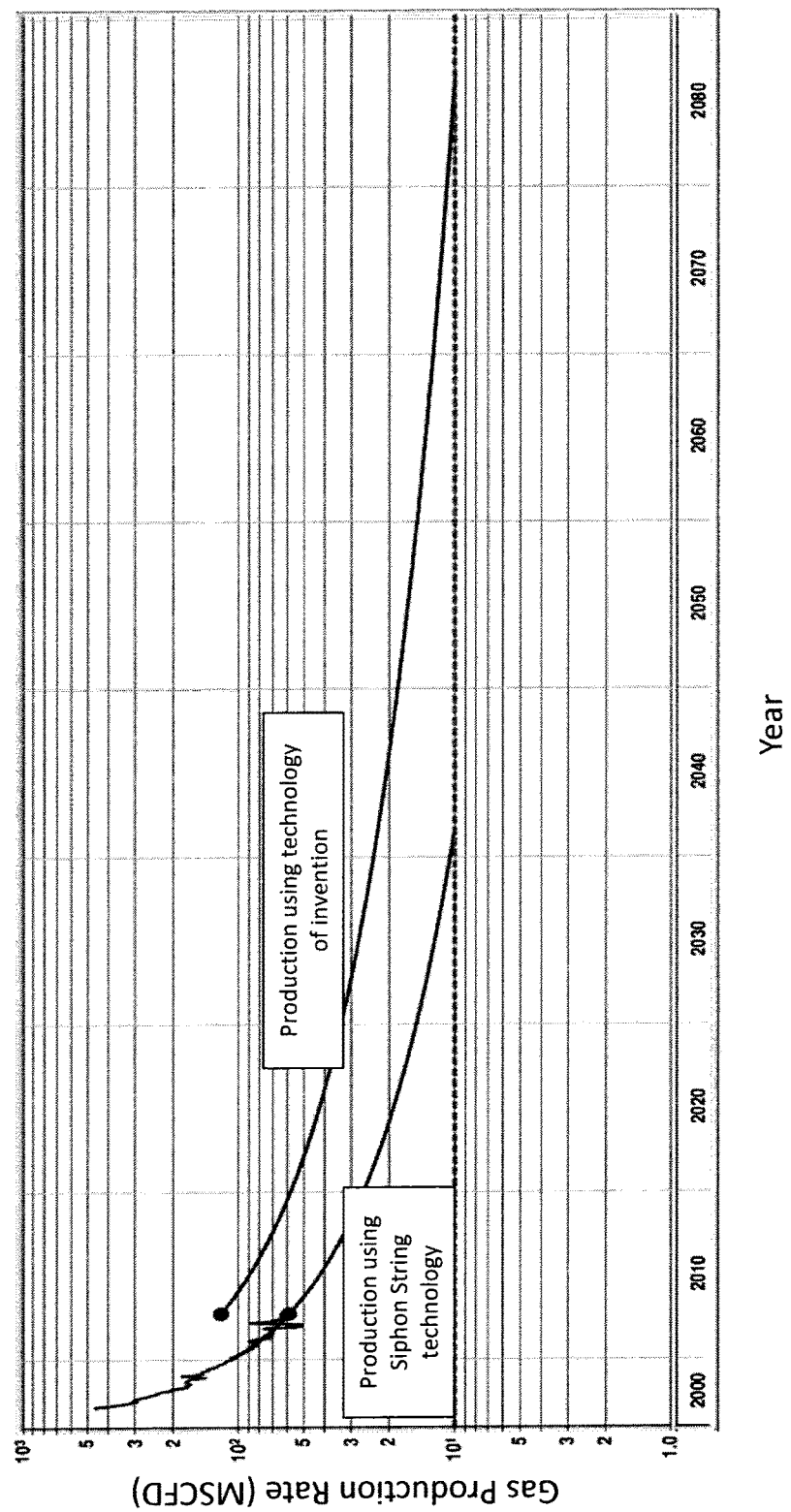
FIG. 14 is a plot showing the gas production rate of a gas well in a field test using siphon string technology which is subsequently replaced with a wellsite installation according to one embodiment of the invention.

In this example, an existing liquid-loaded gas well of the Milk River formation in Alberta was experiencing its final phase of production using existing siphon string technology. As indicated in FIG. 14, modelling of the rate of decline of this well using the siphon string technology (solid line) indicated that it would decline to zero by approximately the year 2030. It was predicted that replacement of the siphon string technology with a wellsite installation with a separator device and related equipment according to one embodiment of the invention would double the production rate and double the lifetime of the well. The siphon string equipment was removed from the well and a wellsite installation of the present invention was deployed in its place. As indicated in FIG. 14, there was an immediate dramatic increase in the production rate and modelling of the rate of decline of the well (solid line) indicated that production would reach zero sometime after the year 2080. Therefore, the original predictions regarding the performance of the wellsite installation of the invention were generally correct.

This example indicates that the system and method of the present invention operate as intended and produce an increased rate of gas production from a liquid-loaded gas well.

Example 2: Analysis of Data Generated at a Test Wellsite Installation

In this example, analysis of data generated at the same wellsite installation described in Example 1 is described. Data were collected during the course of operation of the installation from Oct. 1, 2014 to Oct. 31, 2014. A number of parameters were investigated in order to assess the performance of the wellsite installation. Data points were obtained at 15 minute intervals to investigate volumes of gas produced, volumes of water (and silt) produced and the difference between the bubble tube pressure and the casing pressure to determine the fluid level.

Figure 15A:
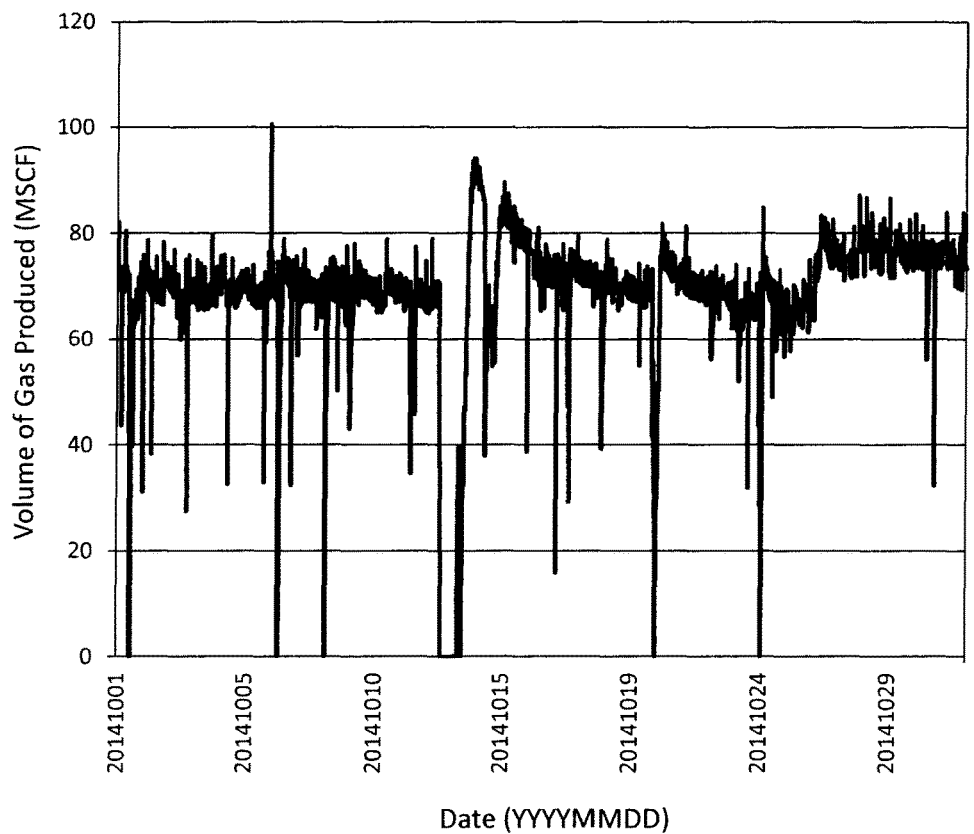
FIG. 15A is a plot of a time course of gas production in a different field test in the same wellsite installation described with respect to FIG. 14.

FIG. 15A is a time course of volume of gas produced (in MSCF), measured at 15 minute intervals from Oct. 1, 2014 (20141001) to Oct. 31, 2014 (20141031). It is seen that the gas production measured is relatively constant between 60 and 80 MSCF with a drop to zero occurring between October 11 and October 15, due to a system shut-down necessitated by pigging issues. It is seen that when the system was re-started on Oct. 15, 2014, the rate of gas production resumed to between 60 and 80 MSCF after a relatively brief re-equilibration period.

Figure 15B:
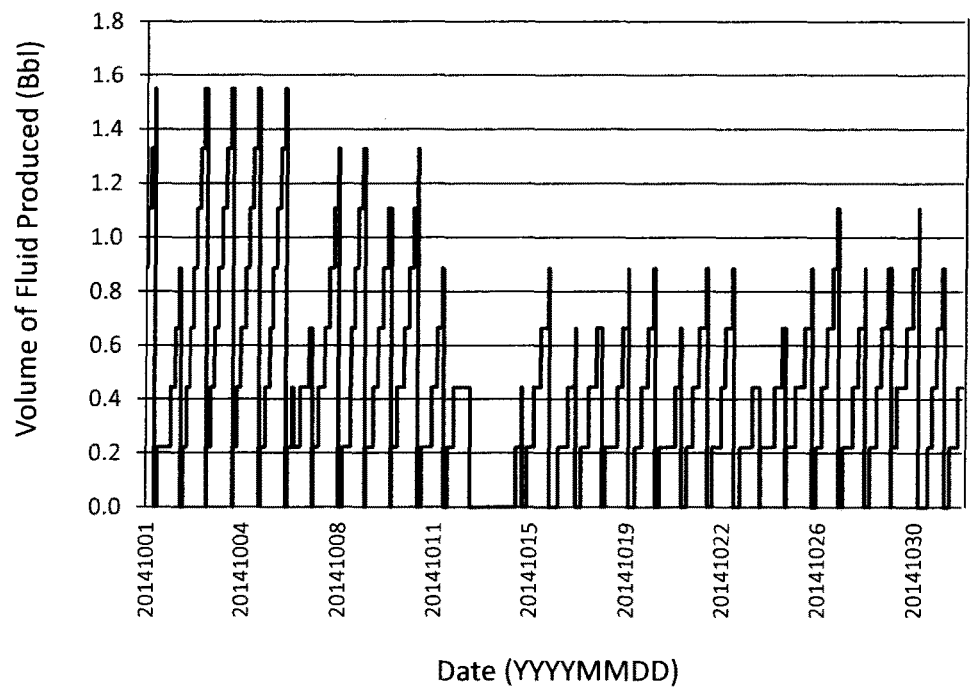
FIG. 15B is a plot of a time course of fluid production in the same field test referred to in FIG. 15A.

FIG. 15B is a time course of the volume of fluid produced from the well (in Bbl). It can be seen the volume drops at regular intervals which indicate the transition from a compression stroke to an exhaust stroke. A drop in fluid production is seen between approximately October 11 and Oct. 13, 2014 due to the system shut-down described above. It is seen that when the system was re-started on Oct. 15, 2014, fluid production resumed.

Figure 15C:
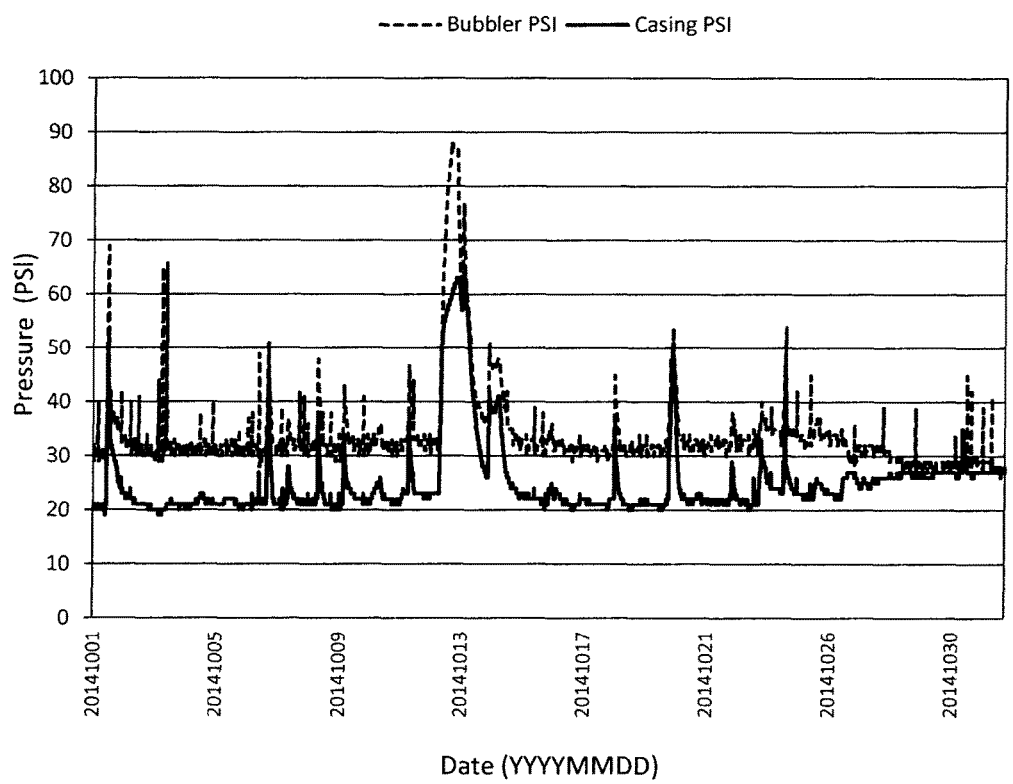
FIG. 15C is a plot of a time course of bubble tube pressure (dashed line) and casing pressure (solid line) in the same field test referred to in FIGS. 15A and 15B.

FIG. 15C shows two time course plots of bubble tube pressure and casing pressure. It is seen that the bubble tube pressure and the casing pressure increased during the shut-down period, as expected.

Figure 16:
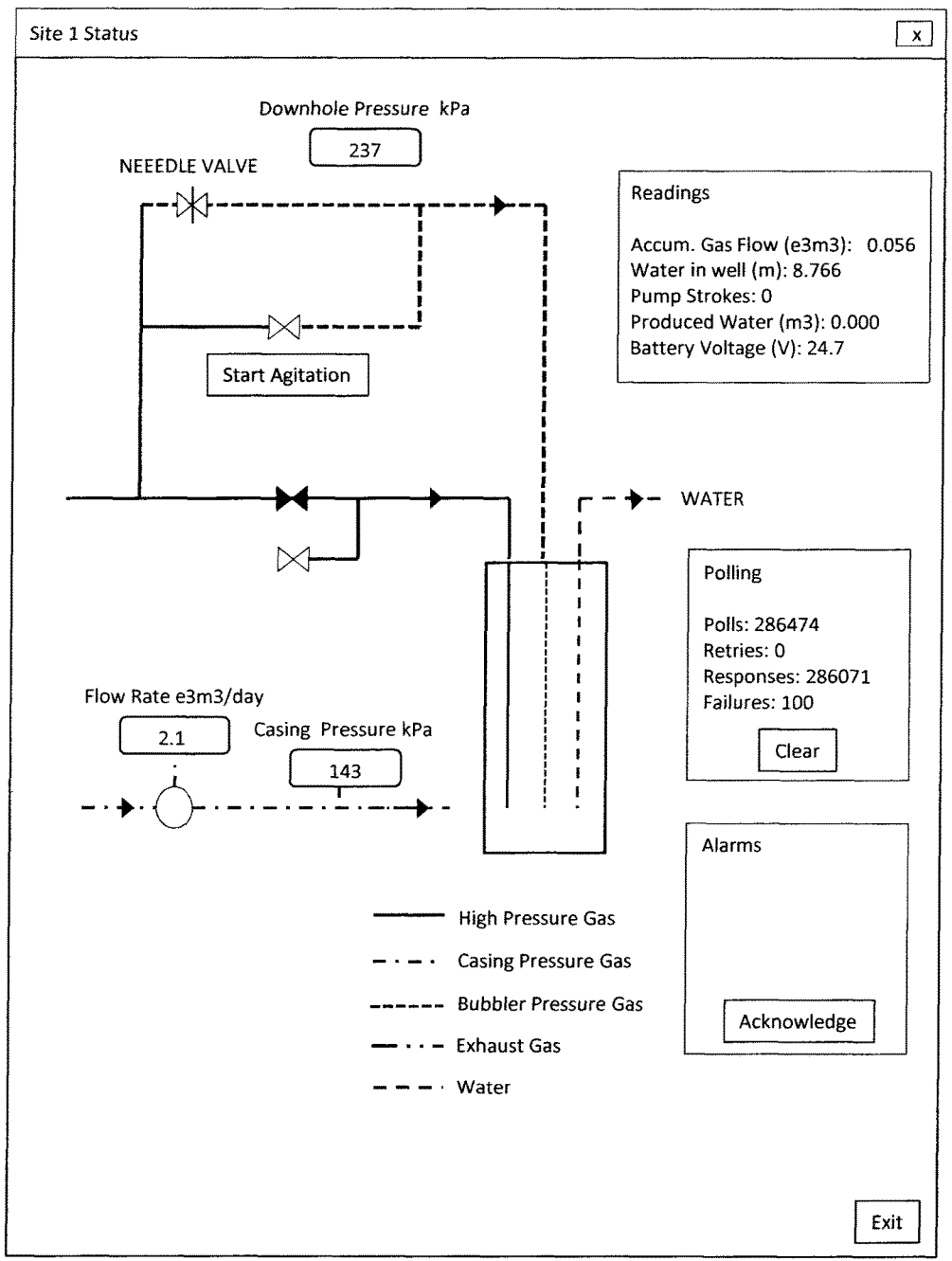
FIG. 16 is an illustration of a user interface screen showing certain aspects of one embodiment of the control system.

FIG. 16 is a representation of a user interface displaying data processed by the control system in the form of a control window. It is seen that prominent real-time data displayed include downhole pressure, flow rate per day and casing pressure. The "readings" box includes data pertaining to accumulated gas flow, depth of water in well, number of pump strokes, volume of produced water and battery voltage. The flow of gases and fluid is illustrated. In the present view of the user interface, a compression stroke is underway, as indicated by the flow of high pressure gas (solid line) and by the exit of water (long-dashed line) from the well. Additionally, bubble tube gas (short dashed line) is flowing into the separator device. An alternative view of the user interface during an exhaust stroke would indicate that exhaust gas (double-dot-dashed line) is moving out of the well and that water is not moving from the well.

This example illustrates some of the capabilities of the control system in providing useful data to an operator regarding performance of the wellsite installation in producing gas and removing fluid from a liquid-loaded gas well. Such data provide an operator with the ability to quickly assess and address any production issues that may arise during operation of the wellsite installation.

EQUIVALENTS AND SCOPE

Other than described herein, or unless otherwise expressly specified, all of the numerical ranges, amounts, values and percentages, such as those for amounts of materials, elemental contents, times and temperatures, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used).

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below.

While this invention has been particularly shown and described with references to embodiments thereof, it will be understood by those skilled in the art that various changes in form and details may be made therein without departing from the scope of the invention encompassed by the appended claims.

The invention claimed is:

1. A device for use in recovery of gas trapped by fluid and suspended solids in a gas or oil well, the device comprising:
    a body defining a cavity with an upper end and an opening for entry of the fluid at its bottom end, the device including a lower valve within the cavity for controlling flow of the fluid into the cavity and an upper valve within the cavity for controlling flow of the fluid and suspended solids out of the cavity, the upper end having a plurality of lines passing therethrough and into the cavity, the lines comprising:
    a) a gas line for providing a stream of pressurized gas to push downward on fluid in the cavity in a compression stroke wherein downward flow of the fluid closes the lower valve and opens the upper valve, the gas line further used to exhaust contained gas from the cavity during an exhaust stroke when infiltration of fluid into the cavity and upward flow of the fluid opens the lower valve and closes the upper valve to raise a fluid level in the cavity;
    b) an effluent line for allowing exit of the fluid and suspended solids during the compression stroke; and
    c) a probe line for providing electrical power to a pair of probes for initiating and halting entry of the stream of pressurized gas into the cavity.

2. The device of claim 1, wherein the upper valve and the lower valve are both located below the pair of probes.

3. The device of claim 1, wherein the probes are spaced vertically apart within the cavity in an arrangement having an upper probe for sensing an upper fluid level to trigger initiation of the compression stroke and a lower probe for sensing a lower fluid level to trigger initiation of the exhaust stroke.

4. The device of claim 1, wherein the cavity further contains a plurality of baffles for halting upward movement of the suspended solids in the fluid as the fluid rises during the exhaust stroke.

5. The device of claim 4, wherein each one of the plurality of baffles is supported by one or more of the plurality of lines in the cavity.

6. The device of claim 5, wherein the baffles are leaf-shaped and include openings for holding the one or more of the plurality of lines.

7. The device of claim 6, wherein the leaf-shaped baffles are rotated with respect to each other to provide partial transverse blockage of the cavity at different cross sectional areas of the cavity.

8. The device of claim 6, wherein one of the openings is configured to hold the effluent line and another one of the openings is configured to hold the probe line.

9. The device of claim 4, wherein the plurality of baffles is three baffles.

10. The device of claim 4, wherein the baffles are supported by or formed integrally with a sidewall of the cavity.

11. The device of claim 1, wherein the effluent line terminates at the upper valve and the upper valve includes an upper ball seat and an upper check ball, wherein the upper valve is closed when the upper check ball is positioned in the upper ball seat during the exhaust stroke and wherein the upper valve is open when the upper check ball floats above the upper ball seat during the compression stroke.

12. The device of claim 1, wherein the lower valve is supported by an extension of the body which extends below the upper valve and the lower valve includes a lower ball seat and a lower check ball, wherein the lower valve is closed when the lower check ball is positioned in the lower ball seat during the compression stroke and wherein the lower valve is open when the lower check valve floats above the lower ball seat during the exhaust stroke.

13. The device of claim 12, wherein the extension of the body which extends below the upper valve is a tube.

14. A device for use in recovery of gas trapped by fluid and suspended solids in a gas or oil well, the device comprising:
    a body defining a cavity with an upper end and an opening for entry of fluid at its bottom end, the device including a lower valve within the cavity for controlling the flow of fluid into the cavity and an upper valve within the cavity for controlling the flow of fluid out of the cavity, the upper end having a plurality of lines passing therethrough and into the cavity, the lines comprising:
    a) a gas line for provision of a stream of pressurized gas to push downward on fluid in the cavity in a compression stroke wherein downward fluid flow closes the lower valve and opens the upper valve, the gas line further used to exhaust contained gas from the cavity during an exhaust stroke when infiltration of fluid into the cavity and upward fluid flow opens the lower valve and closes the upper valve to raise a fluid level in the cavity;
    b) an effluent line for allowing exit of fluid suspended solids during the compression stroke;

c) a probe line for provision of electrical power to a pair of probes for initiating or halting the provision of gas pressure to the cavity; and g) a separate bubble tube line for determining pressure in the device.

15. The device of claim 14, wherein the bubble tube line is configured to be switched to a cleaning line for injection of a second stream of pressurized gas into the device.

16. The device of claim 14, further comprising an adapter attached to the bottom end of the body, the adapter configured for attachment of a pair of nested tubes including an inner tube and an outer tube, the adapter having an opening leading to a channel in an inner sidewall of the adapter, wherein a bottom end of the bubble tube is placed at the opening of the adapter to transmit gas from the bubble tube into a space between a sidewall of the outer tube and a sidewall of the inner tube.

17. The device of claim 16 wherein the inner tube and the outer tube are attachable to the adapter by threading.

18. The device of claim 16, wherein the effluent line terminates below the adapter at the upper valve and the upper valve includes an upper ball seat and an upper check ball, wherein the upper valve is closed when the upper check ball is positioned in the upper ball seat during the exhaust stroke and wherein the upper valve is open when the upper check ball floats above the upper ball seat during the compression stroke.

19. The device of claim 16, wherein the lower valve is supported by the inner tube of the body which extends below the upper valve and the lower valve includes a lower ball seat and a lower check ball, wherein the lower valve is closed when the lower check ball is positioned in the lower ball seat during the compression stroke and wherein the lower valve is open when the lower check valve floats above the lower ball seat during the exhaust stroke.

20. The device of claim 14, wherein the upper valve and the lower valve are both located below the pair of probes.

21. The device of claim 14, wherein the probes are spaced vertically apart within the cavity in an arrangement having an upper probe for sensing an upper fluid level to trigger initiation of the compression stroke and a lower probe for sensing a lower fluid level to trigger initiation of the exhaust stroke when the fluid level rises.

22. The device of claim 14, wherein the cavity further contains a plurality of baffles for halting upward movement of the suspended solids in the fluid as the fluid rises during the exhaust stroke.

23. The device of claim 22, wherein each one of the plurality of baffles is supported by one or more of the plurality of lines in the cavity.

24. The device of claim 23, wherein each of the baffles is leaf-shaped and includes one or more openings for holding the one or more of the plurality of lines.

25. The device of claim 24, wherein the leaf-shaped baffles are rotated with respect to each other to provide transverse blockage of the cavity at different cross sectional areas of the cavity.

26. The device of claim 24, wherein the one or more openings includes a first opening configured to hold the effluent line, a second opening configured to hold the probe line and a third opening configured to hold the bubble tube line.

27. The device of claim 22, wherein the plurality of baffles is three baffles.

28. The device of claim 22, wherein the baffles are supported by or formed integrally with a sidewall of the cavity.

* * * * *